US012056084B2

(12) United States Patent
Byrne et al.

(10) Patent No.: US 12,056,084 B2
(45) Date of Patent: Aug. 6, 2024

(54) MESSAGE SYNCHRONIZATION SYSTEM

(71) Applicant: The Boeing Company, Chicago, IL (US)

(72) Inventors: Joshua R. Byrne, Seattle, WA (US); Ronald James Koontz, Mesa, AZ (US); Sean M. Ramey, Lake Stevens, WA (US); Jason Ellis Sherrill, Mesa, AZ (US); Hyunsuk Shin, Los Angeles, CA (US); David Carl Matthews, Duvall, WA (US)

(73) Assignee: The Boeing Company, Chicago, IL (US)

( * ) Notice: Subject to any disclaimer, the term of this patent is extended or adjusted under 35 U.S.C. 154(b) by 450 days.

(21) Appl. No.: 17/447,732

(22) Filed: Sep. 15, 2021

(65) Prior Publication Data

US 2022/0179720 A1 Jun. 9, 2022

Related U.S. Application Data

(60) Provisional application No. 63/122,976, filed on Dec. 9, 2020.

(51) Int. Cl.
*G06F 11/00* (2006.01)
*G06F 15/163* (2006.01)
*G06F 15/82* (2006.01)

(52) U.S. Cl.
CPC ............ *G06F 15/82* (2013.01); *G06F 15/163* (2013.01)

(58) Field of Classification Search
CPC ............ G06F 11/3013; G06F 11/0751; G06F 11/3006; G06F 11/1683; G06F 11/0724; G06F 11/0721
See application file for complete search history.

(56) References Cited

U.S. PATENT DOCUMENTS

| 2016/0314057 A1* | 10/2016 | De Oliveira | G06F 11/3612 |
| 2019/0155325 A1* | 5/2019 | Lee | G06F 11/1683 |
| 2020/0153810 A1* | 5/2020 | Schwindt | G06F 11/3664 |
| 2020/0372399 A1* | 11/2020 | Lee | G06F 16/94 |

* cited by examiner

*Primary Examiner* — Charles Ehne
(74) *Attorney, Agent, or Firm* — Yee & Associates, P.C.

(57) ABSTRACT

A method for synchronizing messages between processors is provided. The method comprising receiving, by a first external device, inbound messages for applications running redundantly in high integrity mode on two or more multi-core processors. The inbound messages are synchronously copied to the multi-core processors. The multi-core processors send outbound messages to respective alignment queues in the first external device or a second external device, wherein the outbound messages contain calculation results from the inbound messages. The first or second external device compares the alignment queues. Matched outbound messages in the alignment queues are sent to a network or data bus. Any unmatched outbound messages in the alignment queues are discarded.

36 Claims, 21 Drawing Sheets

MESSAGE SYNCHRONIZATION SYSTEM

RELATED PROVISIONAL APPLICATION

This application claims the benefit of U.S. Provisional Patent Application Ser. No. 63/122,976, filed Dec. 9, 2020, and entitled "Message Synchronization System;" which is incorporated herein by reference in its entirety.

BACKGROUND INFORMATION

1. Field

The present disclosure relates generally to an improved computer system and, in particular, to a method and apparatus for managing data flow for processor units in a computer system.

2. Background

Aircraft have many redundant components to increase the reliability, integrity, or reliability and integrity of different aircraft systems. For example, components may be duplicated to increase the reliability of a system, increase the integrity of the system, or increase the reliability and the integrity of the system. This redundancy may be in the form of a duplicate system to improve system performance. For example, computer systems in aircraft may include information redundancy in addition to hardware redundancy. Inaccuracy in information can occur through various sources such as software issues, radiation, or other causes or sources.

Information integrity may be obtained using error detection and correction processes running on computers in the aircraft. The integrity also can include redundancy. With redundancy, performing the same operation multiple times or running the same application on different computers or processor units to obtain multiple copies of the data may be used. These copies of the data may be checked to determine whether the copies match each other.

Some solutions rely on receivers to compare redundant copies of data, while other solutions create the integrity at the data's source. For the latter, current solutions place single core processor units into two or more parallel lanes. Data bus lockstep checking is performed on the messages generated by these processor units. These types of processes are performed using external chips, modifications of the processor architecture, or some combination thereof. These types of solutions are customized for particular types of processors. As a result, when other types of processors are utilized, these solutions may not work well with the characteristics of those other processors, characteristics such as memory bus architecture, available comparison points, or other characteristics.

Therefore, it would be desirable to have a method and apparatus that take into account at least some of the issues discussed above, as well as other possible issues. For example, it would be desirable to have a method and apparatus that overcomes the technical problem of achieving data integrity when using processor units with either a single core or multiple cores, while obtaining desired efficiency for processing data using the processor units.

SUMMARY

An illustrative embodiment provides a method for synchronizing messages between processors. The method comprising receiving, by a first external device, inbound messages for applications running redundantly in high integrity mode on two or more multi-core processors. The inbound messages are synchronously copied to the multi-core processors. The multi-core processors send outbound messages to respective alignment queues in the first external device or a second external device, wherein the outbound messages contain calculation results from the inbound messages. The first or second external device, compares the alignment queues. Matched outbound messages in the alignment queues are sent to a network or data bus. Any unmatched outbound messages in the alignment queues are discarded.

Another illustrative embodiment provides a method for synchronizing messages between processors. The method comprising receiving a number of inbound messages at a first external device, wherein the inbound messages are designated for a number of applications running redundantly in high integrity mode on a first processor and a second processor, wherein the first and second processors each comprise a number of cores. The inbound messages are synchronously copied to respective memory buffers in the first and second processors. The applications read the inbound messages from the respective memory buffers, perform calculations according to the inbound messages, and output calculation results. The first and second processors send respective outbound messages containing the calculation results to respective alignment queues in the first external device or a second external device. The first or second external device, compares the alignment queues and determines if the alignment queues contain matching outbound messages. If the alignment queues contain matched outbound messages, the first or second external device sends the matched outbound messages to a network or data bus. If one of the alignment queues contains an unmatched outbound message, the first or second external device, discards the unmatched outbound message.

Another illustrative embodiment provides a system for synchronizing messages between processors. The system comprises two or more multi-core processors and an external device configured to: receive inbound messages for applications running redundantly in high integrity mode on the multi-core processors, wherein the inbound messages are synchronously copied to the multi-core processors; receive, in respective alignment queues, outbound messages sent by the multi-core processors, wherein the outbound messages contain calculation results from the inbound messages; compare the alignment queues; send matched outbound messages in the alignment queues to a network or data bus; and discard any unmatched outbound messages in the alignment queues.

Another illustrative embodiment provides a system for synchronizing messages between processors. The system comprises two or more multi-core processors, a first external device configured to receive inbound messages for applications running redundantly in high integrity mode on the multi-core processors, wherein the inbound messages are synchronously copied to the multi-core processors, and a second external device configured to: receive, in respective alignment queues, outbound messages sent by the multi-core processors, wherein the outbound messages contain calculation results from the inbound messages; compare the alignment queues; send matched outbound messages in the alignment queues to a network or data bus; and discard any unmatched outbound messages in the alignment queues.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that increasing the integrity of data output is desirable when using any pair or grouping of processor units running one or more redundant applications. The illustrative embodiments recognize and take into account that a mode of operation for increasing the integrity of data is a high integrity mode of operation as compared to normal processing of data which is referred to as a standard integrity mode of operation.

Thus, the illustrative embodiments provide a method, apparatus, and system for managing data. In one illustrative example, a message management system comprises an integrity manager. The integrity manager has mixed integrity modes and is configured to manage an exchange of messages between processor units and an external node based on a selected mode in the mixed integrity modes. The integrity manager is located in hardware in communication with the processors and the external node and checks that redundantly calculated outputs from processor units match in a high integrity mode.

Figure 1:
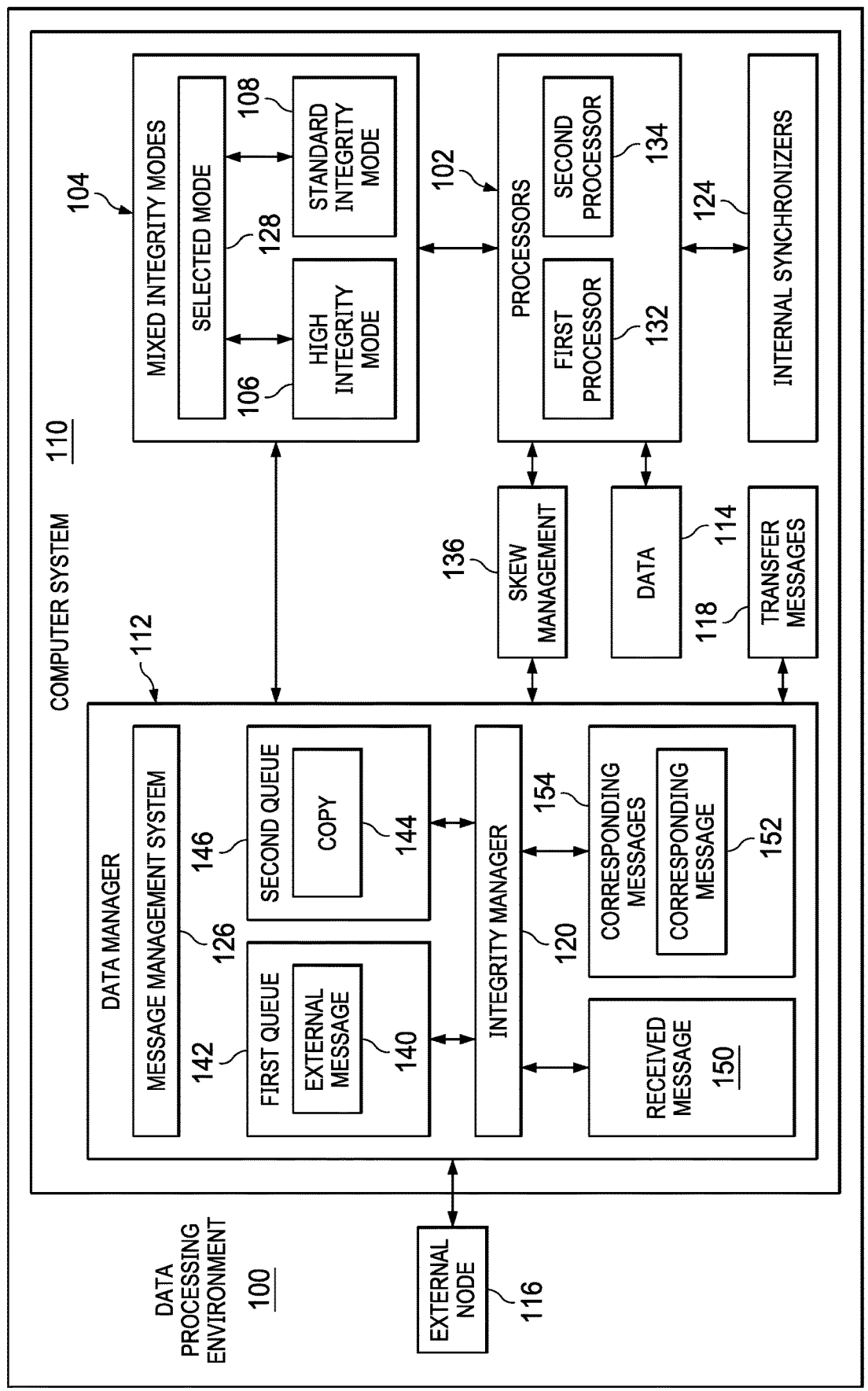
FIG. 1 is an illustration of a block diagram of a data processing environment in accordance with an illustrative embodiment.

With reference now to the figures and, in particular, with reference to FIG. 1, an illustration of a block diagram of a data processing environment is depicted in accordance with an illustrative embodiment. Data processing environment 100 is an environment in which processors 102 can be managed in mixed integrity modes 104. In this example, processors 102 are selected from at least one of a multi-core processor unit, a single core processor unit, a homogeneous multi-core processor unit, a heterogeneous multi-core processor unit, a graphics processor unit, a general-purpose processor unit, or some other suitable type of processor unit.

In the illustrative example, processors 102 can be of the same type or of a different type. When processors 102 are of the same type, those processor units may have at least one of the same instruction set, design, model, part number, or other parameters for defining the type for processors 102.

In this illustrative example, mixed integrity modes 104 include high integrity mode 106 and standard integrity mode 108. At least one of message comparison or message synchronization between lanes for processors 102 is performed in high integrity mode 106. In the illustrative embodiments, a lane is a processor.

When in high integrity mode 106, integrity manager 120 checks that redundantly calculated outputs from multiple processors in processors 102 match. In the illustrative example, match means that data sent from the multiple processors are the same. Integrity manager 120 checks to ensure that the same data is being sent from multiple processors.

For example, two processors operating in high integrity mode 106 can run the same application and are instructed to perform the same function or processing of data. In high integrity mode 106, integrity manager 120 checks to ensure that the outputs generated by the two processors are the same.

As depicted, processors 102 are located in computer system 110. As depicted, computer system 110 is a physical hardware system and includes one or more data processing systems. When more than one data processing system is present, the processor units can be located in a single data processing system or in more than one of the data processing systems. Furthermore, when more than one data processing system is present, those data processing systems are in communication with each other using a communications medium. The communications medium may be a network. The data processing systems may be selected from at least one of a computer, a server computer, a tablet, or some other suitable data processing system.

In the present illustrative example, data manager 112 manages at least one of the processing of data 114 or the exchange of data 114 for processors 102. As depicted, data manager 112 is located in computer system 110. Data manager 112 may be located on the same or different data processing system from processors 102 in computer system 110.

As depicted, data manager 112 manages the processing of data 114 by processors 102. For example, when processors 102 operate in high integrity mode 106, data manager 112 may align the timing of processors 102 to process data 114. This alignment in timing may cause processors 102 to concurrently process data 114 in a synchronized fashion. In other words, processors 102 synchronously run the same application to process data 114 to generate results at substantially the same time. This concurrent processing across processors 102 may occur within a specified time skew tolerance according to skew management 136. These results may be generated by two or more of processors 102 in which these results may be compared to determine the integrity of the results generated from processing data 114.

As depicted, two or more of processors 102 can operate in high integrity mode 106 while other processors in processors 102 can operate in standard integrity mode 108. In other words, data manager 112 can manage processing and data with different modes in mixed integrity modes 104 at the same time. Mixed integrity modes 104 might mean that some of processors 102 can operate in high integrity mode 106 while other processors in processors 102 can operate in standard integrity mode 108. Mixed integrity modes 104 might also mean that all of processors 102 can operate in high integrity mode 106 or in standard integrity mode 108. In the case of multi-core processors, mixed integrity modes 104 can also be applied to individual cores within a processor rather than the whole processor. For example, a number of applications might run in high integrity mode 106 on respective cores in both processors 132 and 134, and other applications might run in standard integrity mode 108 on cores in only one of processor 132 or processor 134, allowing multi-core processors to run both high integrity and standard integrity applications simultaneously (see FIG. 2 below). Mixed integrity modes 104 are applied at the message level, allowing a system designer to decide if an integrity mode applies to only a subset of messages on a processor or all messages on the processor.

In other illustrative examples, data manager 112 can manage the exchange of data 114 with external node 116. When operating in high integrity mode 106, data manager 112 can align the timing of at least one of the receiving or transmitting of transfer messages 118 containing data 114. For example, data manager 112 can manage the receiving of messages by two or more of processors 102 such that these processors receive the same messages in transfer messages 118 at substantially the same time.

These and other functions can be performed using a number of different functions within at least one of data manager 112 for processors 102. For example, the functions can be performed using at least one of integrity manager 120 in data manager 112 or one or more of internal synchronizers 124 in processors 102.

In one illustrative example, message management system 126 can be provided using integrity manager 120. In this illustrative example, integrity manager 120 has mixed integrity modes 104. As depicted, integrity manager 120 is configured to manage an exchange of transfer messages 118 between processors 102 and external node 116 based on selected mode 128 in mixed integrity modes 104. In this illustrative example, integrity manager 120 is located in hardware in communication with processors 102 and external node 116.

As depicted, external node 116 is located outside of computer system 110. In other examples, external node 116 can be located inside of computer system 110. External node 116 may take a number of different forms. For example, external node 116 may be selected from a group comprising an external processor communicating with processors 102, an embedded computer, a desktop computer, a network device, a network switch, and some other suitable type of external device.

As depicted, integrity manager 120 is configured to manage processors 102, or cores within processors 102, operating simultaneously in high integrity mode 106 and standard integrity mode 108. Integrity manager 120 can be configured to synchronize at least one of receiving transfer messages 118 for processors 102 or transmitting transfer messages 118 for processors 102 when selected mode 128 in mixed integrity modes 104 is high integrity mode 106.

For example, integrity manager 120 is configured to place external message 140 received in transfer messages 118 from external node 116 in first queue 142 for first processor 132 and place copy 144 of external message 140 in second queue 146 for second processor 134 when first processor 132 and second processor 134 (or cores within them) operate using high integrity. Integrity manager 120 controls first queue 142 and second queue 146 such that both first processor 132 reads from first queue 142 and second processor 134 reads from second queue 146 to a same depth such that parallel lane coherency is present. In the illustrative examples, depth is the number of messages in a queue.

In the illustrative example, in addition to managing queues, integrity manager 120 compares received message 150 received from first processor 132 with corresponding message 152 in corresponding messages 154 received from second processor 134. Integrity manager 120 sends received message 150 to external node 116 when received message 150 and corresponding message 152 match.

The comparison made by integrity manager 120 can be performed in a number of different ways. For example, the comparison can be made using at least one of a bit-by-bit compare or a cyclic redundancy check. In the present example, integrity manager 120 discards received message 150 and corresponding message 152 if they do not match or if only one of received message 150 or corresponding message 152 is received within a selected timeframe (including a specified skew tolerance). The illustrative embodiments can maintain coherency between inbound and outbound messages even with some skew managed within specified tolerances, thereby eliminating the need to lock-step message operations.

Furthermore, each of processors 102 can truncate data values prior to transmitting messages to integrity manager 120 to reduce the accuracy of the values when integrity manager 120 compares the messages using a bit by bit comparison, which is an exact check. For example, if the values in the messages are 64 bits, all 64 bits are checked if truncating is not used. In some cases, undesired results can occur between processors 102 operating in different lanes when processing data using a bit by bit comparison. As a result, processors 102 can truncate one or more bits to reduce the accuracy level. Thus, a variable level of precision can be achieved by processors 102 truncating bits when processors 102 are in high integrity mode 106.

At least one of integrity manager 120 or internal synchronizers 124 may be implemented in software, hardware, firmware, or a combination thereof. When software is used, the operations performed by at least one of integrity manager 120 or internal synchronizers 124 may be implemented in program code configured to run on hardware, such as a processor unit. When firmware is used, the operations performed by at least one of integrity manager 120 or internal synchronizers 124 may be implemented in program code and data and stored in persistent memory to run on a processor unit. When hardware is employed, the hardware may include circuits that operate to perform the operations in at least one of integrity manager 120 or internal synchronizers 124.

In the illustrative examples, the hardware may take a form selected from at least one of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field-programmable logic array, a field-programmable gate array, and other suitable hardware devices. Additionally, the processes may be implemented in organic components integrated with inorganic components and may be comprised entirely of organic components excluding a human being. For example, the processes may be implemented as circuits in organic semiconductors.

For example, integrity manager 120 can be implemented in hardware as a single logic device or as a plurality of different types of logic devices. The different types of logic devices can be selected to reduce potential issues, such as common mode failures. For example, a first logic device can be a field-programmable gate array, while a second logic device can be an application-specific integrated circuit (ASIC). Further, when more than one logic device is used, each logic device has a lane through which messages are processed for a particular processor unit. The logic devices may have connections so the logic devices can be aligned in time.

In one illustrative example, one or more technical solutions are present that overcome a technical problem with obtaining desired efficiency in redundancy for processing data using processor units. As a result, one or more technical solutions may provide a technical effect increasing efficiency processing data by processor units. For example, one or more technical solutions may enable at least one of aligning the timing in the processing data or processing messages by processor units operating in a high integrity mode.

As a result, computer system 110 operates as a special purpose computer system in which at least one of data manager 112 or internal synchronizers 124 in computer system 110 enables managing the processing of data 114 in a manner that allows for mixed integrity modes 104 to be present during processing of data 114. In particular, at least one of data manager 112 or internal synchronizers 124 transforms computer system 110 into a special purpose computer system as compared to currently available general computer systems that do not have data manager 112, internal synchronizers 124, or both.

The illustration of data processing environment in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, data processing environment 100 is shown only with external node 116. In another illustrative example, one or more external nodes are present in addition to or in place of external node 116.

Although the illustrative example is described with respect to aircraft, other illustrative examples may be applied to other uses. For example, an illustrative example may be implemented for use in medical imaging, accounting, weather forecasting, or other suitable uses.

In the present example, two integrity modes 106, 108 are shown for mixed integrity modes 104. In other illustrative examples, other numbers of integrity modes may be present. For example, three integrity modes, five integrity modes, or some other number of integrity modes can be utilized. These additional integrity modes, for example, use different numbers of comparisons. For example, with three integrity modes, an application may run on three different processor units in processors 102 and process the same data. The outputs from the application running on the three processor units can be compared and voted by integrity manager 120 in data manager 112. In voting, the outputs from the three processor units are compared. A majority is identified for the output value. The majority can be two out of three or three out of three output values being the same. This output value is the value that is used. The minority output value is discarded.

Figure 2:
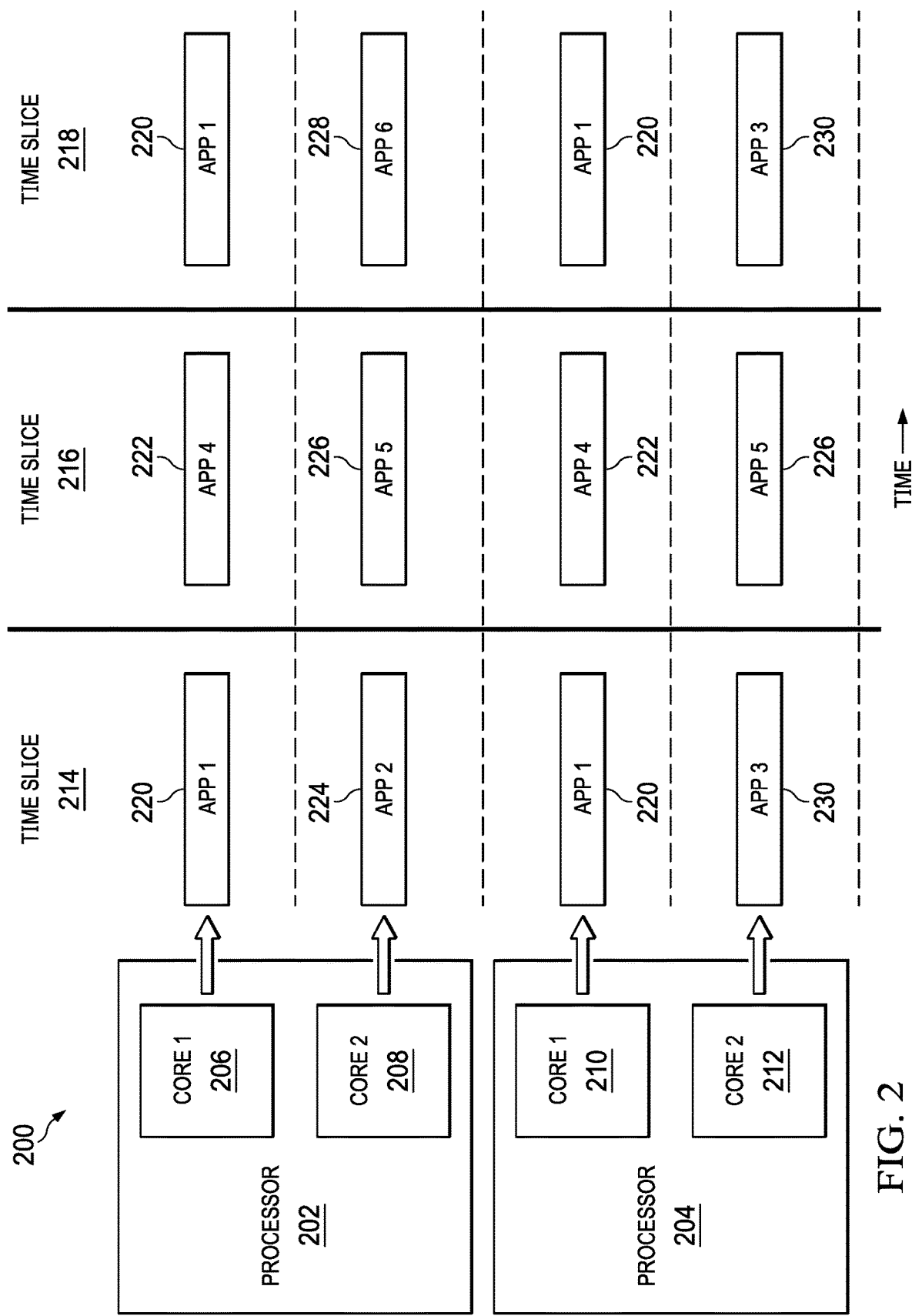
FIG. 2 is an illustration of a mixed integrity data processing system in accordance with an illustrative embodiment.

With reference next to FIG. 2, an illustration of a mixed integrity data processing system is depicted in accordance with an illustrative embodiment. In this illustrative example, mixed integrity data processing system 200 can be implemented using processors 102 in FIG. 1 under the control of data manager 112 of FIG. 1.

In this illustrative example, processor 202 and processor 204 are multicore processors. As depicted, processor 202 includes core 1 206 and core 2 208. Processor 204 contains core 1 210 and core 2 212. As depicted, these different cores run applications during time slices (windows), such as time slice 214, time slice 216, and time slice 218.

In this illustrative example, core 1 206 in processor 202 runs application 1 220 during time slice 214, application 4 222 during time slice 216, and application 1 220 during time slice 218. Core 2 208 in processor 202 runs application 2 224 during time slice 214, application 5 226 during time slice 216, and application 6 228 during time slice 218.

As depicted, core 1 210 in processor 204 runs application 1 220 during time slice 214, application 4 222 during time slice 216, and application 1 220 during time slice 218. Core 2 212 in processor 204 runs application 3 230 during time slice 214, application 5 226 during time slice 216, and application 3 230 during time slice 218.

Application 1 220 is run by core 1 206 in processor 202 and core 1 210 in processor 204 using a high integrity mode in which application 1 220 runs on core 206 and core 210 at substantially the same time, within a managed skew tolerance. In a similar fashion, application 4 222 is also run in a high integrity by core 1 206 and core 1 210. Core 2 208 in processor 202 and core 2 212 in processor 204 both run application 5 226 in a high integrity mode.

Application 2 224 and application 6 228 are run in a standard integrity by core 2 208 in processor 202. Application 3 230 is run in a standard integrity by core 2 212 in processor 204.

At least one of the processing of data or the exchange of messages are managed by data manager 112 in FIG. 1 to provide for the mixed integrity modes in this example. In some examples, the process can be applied to modes for cores to achieve a higher level of granularity.

The illustration of mixed integrity data processing system 200 is provided as an example of one implementation of how processor 102 in FIG. 1 can be implemented for mixed integrity processing of data 114 in FIG. 1. This illustration is not meant to limit the manner in which other illustrative examples can be implemented. For example, other numbers of processors can be implemented in other illustrative examples, and each processor can have any number of cores.

Figure 3:
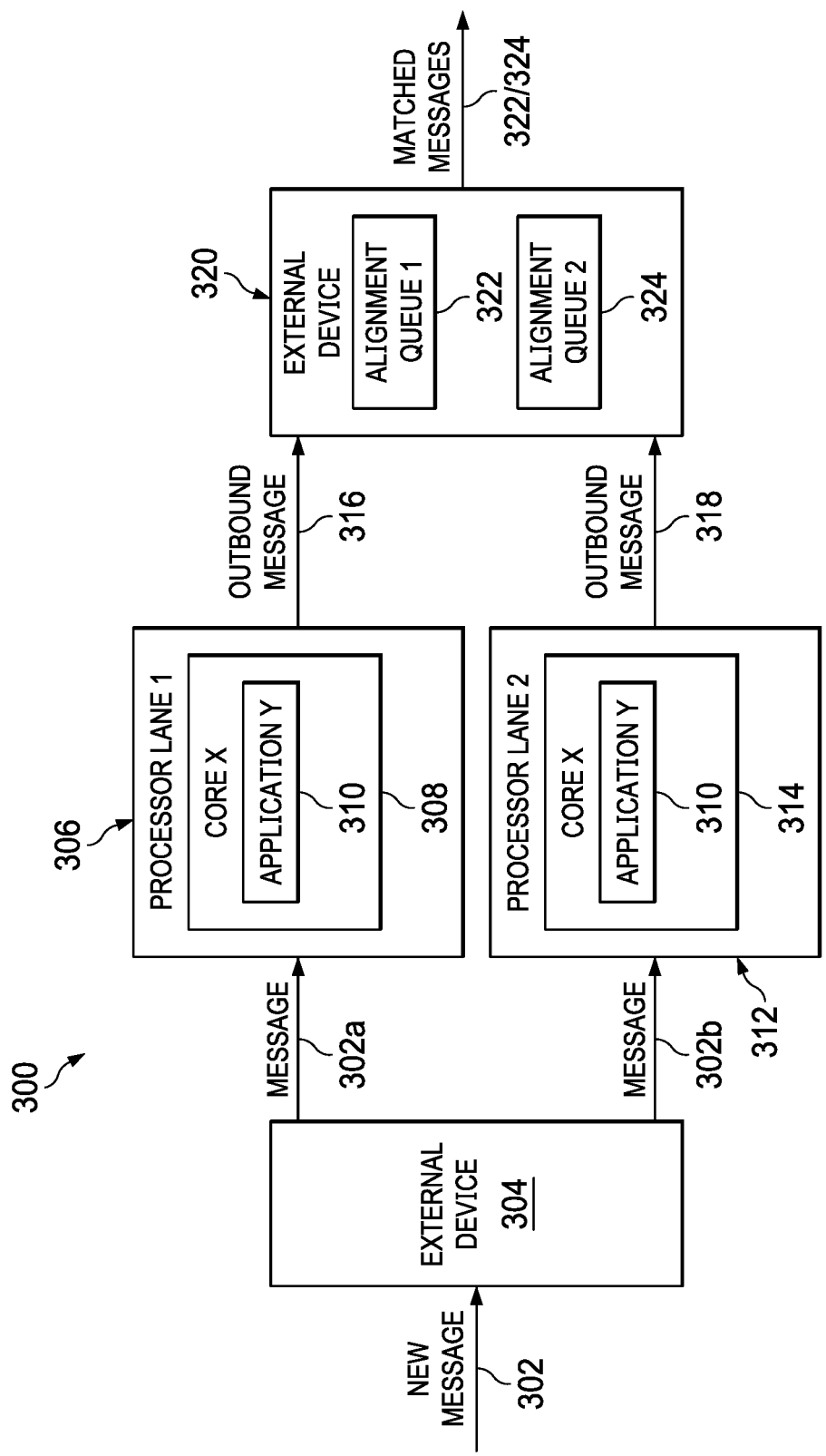
FIG. 3 illustrates a system for synchronizing data input and output across processors in accordance with an illustrative embodiment.

FIG. 3 illustrates a system for synchronizing data input and output across processors in accordance with an illustrative embodiment. System 300 can be implemented in data processing environment 100 shown in FIG. 1. Processor lane 1 306 and processor lane 312 might be example of processors 102 in FIG. 1. External device 304 and external device 320 might be examples of data manager 112 in FIG. 1.

In the example shown in FIG. 3, high integrity data is synchronized across two multi-core processors. However, it should be noted that the method of the illustrative embodiments can be implemented across a larger number of processors. Furthermore, for ease of illustration, the illustrative embodiments described below assume high integrity applications run across symmetric cores (i.e., application runs in the same respective cores of each processor). Therefore, application Y 310 running on both processor lane 1 306 and processor lane 2 312 will run in each processor's respective Core X 308, 314 (e.g., core 1). However, it should be understood that the illustrative embodiments can be implemented with asymmetric cores (e.g., a high integrity application runs concurrently on core 1 of lane 1 and core 3 of lane 2).

When external device 304 receives new message 302 from an external network or data bus it pushes copies 302a, 302b of message 302 to Processor Lane 1 306 and Processor Lane 2 312, respectively. Message 302 includes a header that identifies what kind of message it is. A configuration file provided to external device 304 and processor lanes 1 and 2 306, 312 determines what applications should receive message 302 according to its header. In the present example, message 302 is for application Y 310 but could also be received by other applications. Therefore, message copies 302a, 302b are pushed to respective buffers in core X 308, 314 of each processor. External device 304 pushes (or software on processor lanes 306, 312 pull) the message copies 302a, 302b at approximately the same time (within skew tolerance).

After message copies 302a, 302b have been pushed to the respective buffers, application Y 310 running on both processor lanes 306, 312 reads the message 302 and performs a scheduled calculation according to the message. Application Y 310 runs on both processor lanes 306, 312 during the same time window. Application Y 310 cannot run on either processor lane while message copies 302a, 302b are being loaded into the buffers, thereby ensuring both lanes 306, 312 have the same data for the same calculation during the same time window. There might be some skew in time due to multicore contention and/or variations in execution speed of different processors.

Results from calculations based on message 302 are sent as respective outbound messages 316, 318 from processor lanes 306, 312 to external device 320. External device 320 might be external device 304 (i.e., outbound messages 316, 318 are sent back to external device 304) or another external device. Outbound messages 316, 318 are sent to respective alignment queues 322, 324 in external device 320. External device 320 uses alignment queues 322, 324 to determine if outbound messages 316, 318 match each other, meaning their content is identical and they arrive in the queues 322, 324 within the same timeframe (providing for a specified skew tolerance threshold).

If outbound messages 316, 318 in alignment queues 322, 324, respectively, match, external device 320 sends the matched messages to an external network/data bus. External device can send the match messages as parallel copies for further integrity or can wrap the data in protections such as, e.g., cyclic redundancy check (CRC).

External device 320 discards any unmatched message. Outbound messages 316, 318 are considered unmatched if their content is not identical (i.e., processor lane 1 306 and processor lane 2 312 did not calculate the same answer) or a message arrives in its respective alignment queue but the other message does not arrive in its alignment queue within the specified timeframe before a timeout.

Figure 4:
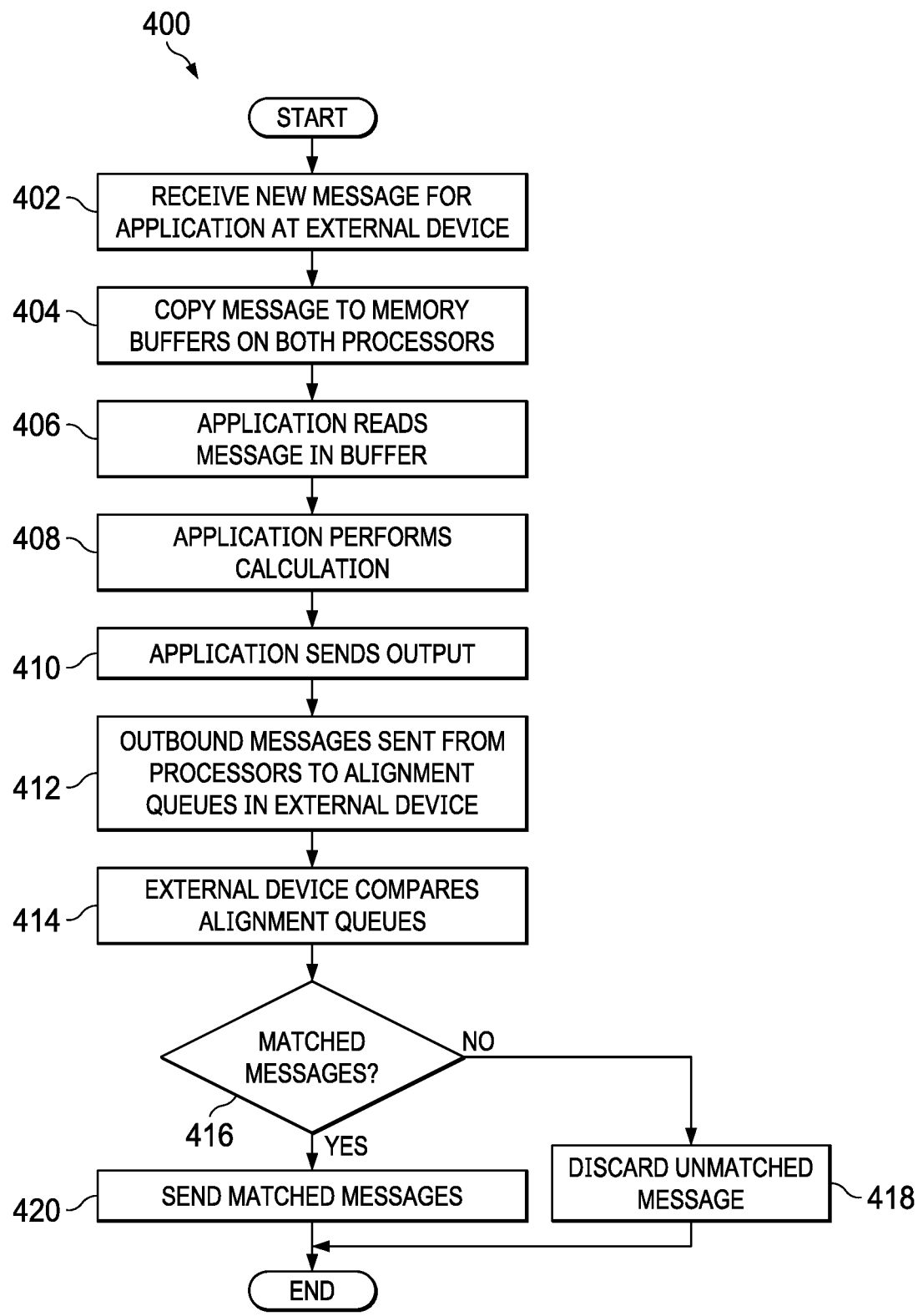
FIG. 4 illustrates a flowchart for a process of synchronizing data input and output across processors in accordance with an illustrative embodiment.

FIG. 4 illustrates a flowchart for a process of synchronizing data input and output across processors in accordance with an illustrative embodiment. The process in FIG. 4 can be implemented in hardware, software, or both. When implemented in software, the process can take the form of program code that is run by one of more processor units located in one or more hardware devices in one or more computer systems. Process 400 can be implemented in system 300 shown in FIG. 3.

Process 400 begins by receiving a new inbound message from an external network or data bus at a first external device, wherein the message is for an application that runs concurrently across a first processor and a second processor in a high integrity mode (step 402).

The inbound message is then synchronously copied to a number of respective memory buffers for the application on both processors (step 404). The message copies might be pushed to the memory buffers by the external device. The message copies might also be pulled from the external device by software running the processors.

As noted above, if the first and second processors are multi-core processors, the application can be scheduled to run in the same respective core of both processors (i.e., symmetric cores) or on different cores (i.e., asymmetric cores). The application cannot read from the application buffers during the timeframe the inbound message is being loaded into those buffers, thereby ensuring the application reads the same inbound message when it runs concurrently across the first and second processors.

After the inbound message has been pushed to and loaded into the application memory buffers, the application reads the message in the buffers on both the first and second processors (step 406), synchronously performs a calculation on both processors during the same time window according to the inbound message (step 408), and sends an output from the calculation (step 410).

After the application performs the scheduled calculation, the results are sent as respective outbound messages by the first and second processors to respective first and second alignment queues in an external device (step 412). The external device might be the first external device that received the inbound message or a second external device. The external device compares the alignment queues (step 414) and determines if the alignment queues contain matching outbound messages (step 416).

If the alignment queues contain matched outbound messages, the external device sends the matched outbound messages to an external network or data bus (step 420). The external network/data bus might be the same one from which the inbound message is received or a second external network/data bus.

If one of the alignment queues contains an unmatched outbound message, the external device discards the unmatched message (step 418). Process 400 then ends.

FIGS. 5-22 illustrate alternative ways inbound messages can be synchronized for high integrity processing across multiple processors.

Figure 5:
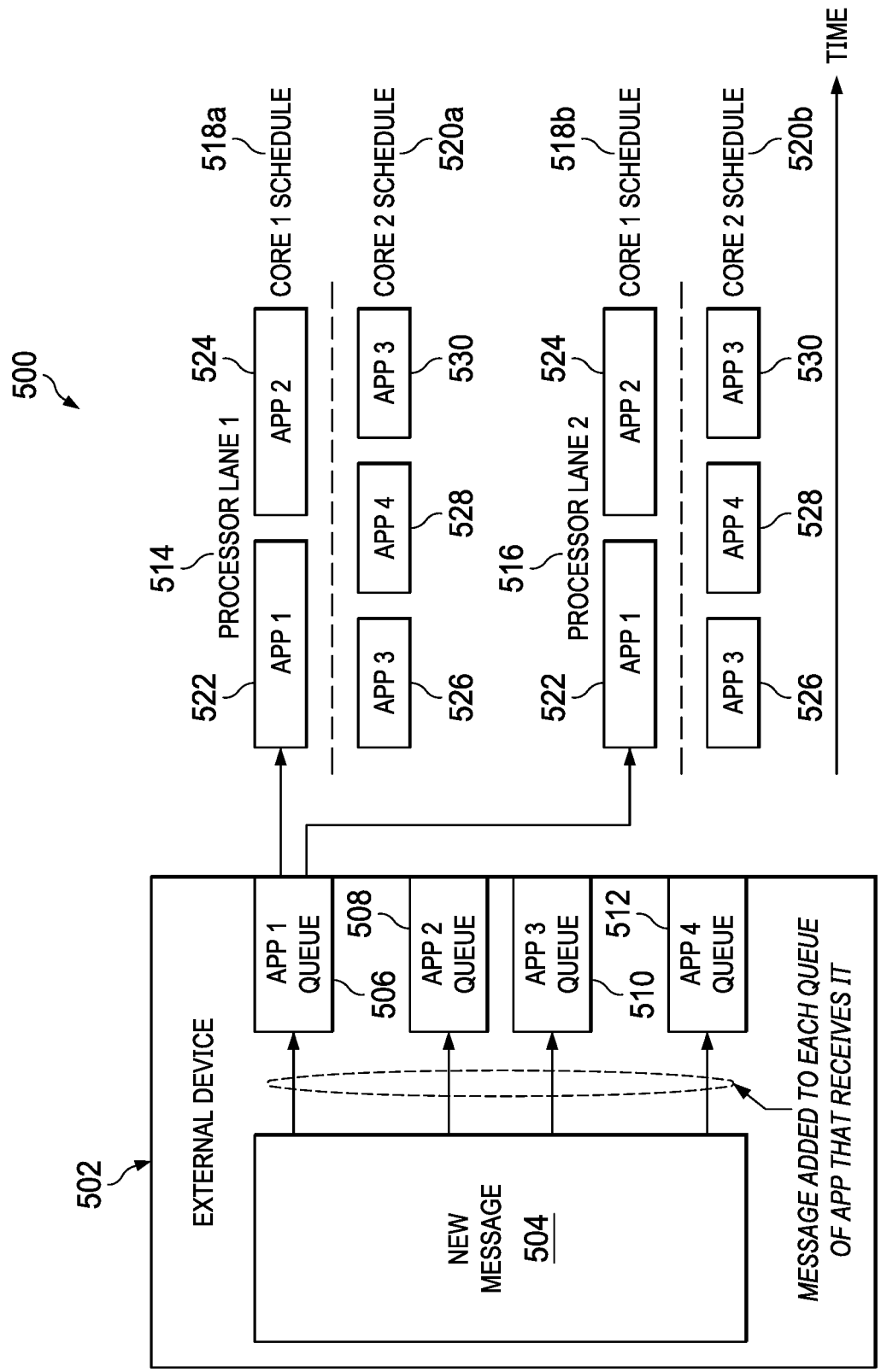
FIG. 5 illustrates a configuration for high integrity data processing of inbound messages in accordance with an illustrative embodiment.

FIG. 5 illustrates a configuration for high integrity data processing of inbound messages in accordance with an illustrative embodiment. Configuration 500 can be implemented in system 300 shown in FIG. 3.

In configuration 500, external device 502 comprises a message queue for each software partition/application. In the present example, there are four applications running across two multi-core processor lanes 514, 516. Application 1 522 and application 2 524 are both scheduled to run on core 1 518a of processor lane 1 514 and core 1 518b of processor lane 2 516. Similarly, application 3 526 and application 4 528 are both scheduled to run on core 2 520a of processor lane 1 514 and core 2 520b of processor lane 2 516.

External device 502 comprises queue 506 for application 1 522, queue 508 for application 2 524, queue 510 for application 3 526, and queue 512 for application 4 528.

When external device 502 receives new message 504, it adds the message to the queue of each application that is meant to receive the message. External device 502 pushes a copy of message 504 to each software partition/application that receives that receives the message. In the present example, message 504 is pushed to application 1 522. Message 504 is pushed directly to the correct message buffer (or First In First Out (FIFO) queue, depending on the needs of the software) for application 1 522 in core 1 518a, 520b of processor lanes 514, 516.

External device 502 does not push a message from a partition's queue (e.g., queue 506) while that partition is running. Therefore, the message is never updated while the partition in question (e.g., application 1 522) is reading data from its buffer.

Queuing ports (e.g., original write and read position indicators) provide feedback to let external device 502 know if any of the queues 506, 508, 510, 512 overflow.

Figure 6:
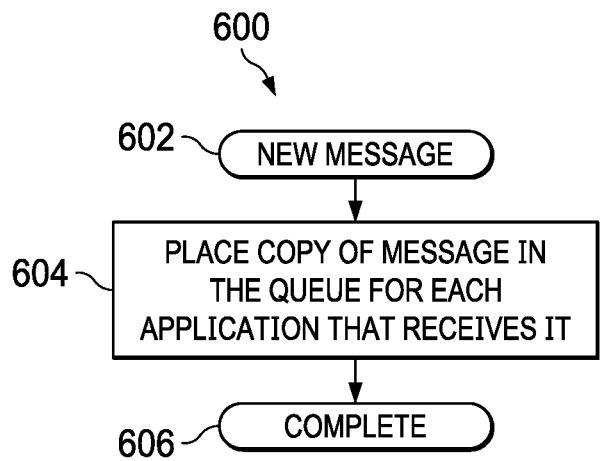
FIG. 6 illustrates a flowchart of a process for receiving a new message for high integrity data processing in accordance with an illustrative embodiment.

FIG. 6 illustrates a flowchart of a process for receiving a new message for high integrity data processing in accordance with an illustrative embodiment. Process 600 can be implemented by external device 502 in FIG. 5.

Process 600 begins with the external device receiving a new message from an external network/data bus (step 602). The external device then places a copy of the new message in the queue for each application that is supposed to receive it (step 604). Process 600 is then complete (step 606).

Figure 7:
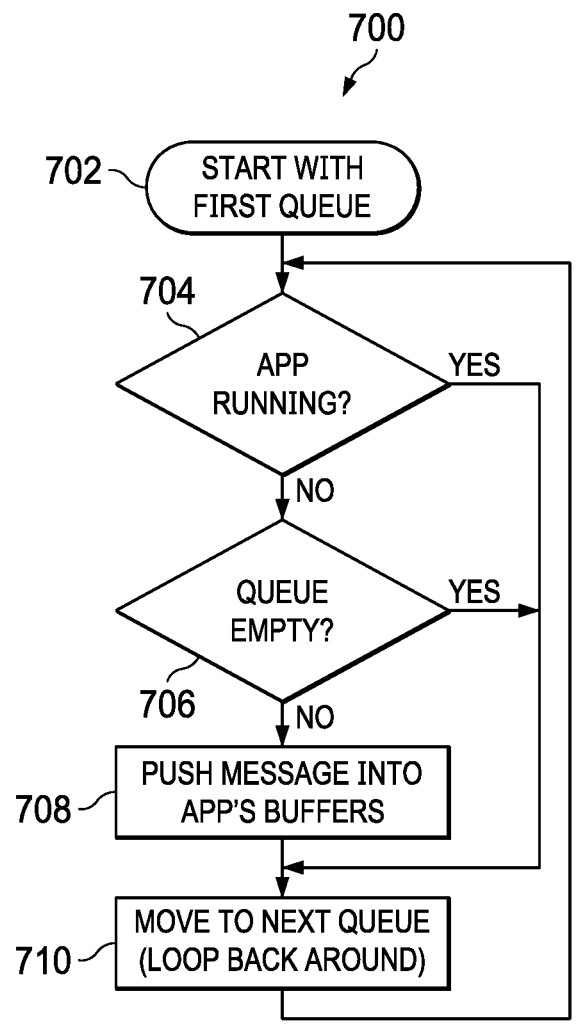
FIG. 7 illustrates a flowchart of a process for pushing a new message to application buffers for high integrity data processing in accordance with an illustrative embodiment.

FIG. 7 illustrates a flowchart of a process for pushing a new message to application buffers for high integrity data processing in accordance with an illustrative embodiment. Process 700 can be implemented by external device 502 in FIG. 5. External device 502 performs process 700 concurrently for both processor lanes.

Process 700 begins by the external device starting with the first application queue (step 702) and determining if that application is running (step 704). If the application in question is running, the external processor moves to the next application queue (step 710).

If the application is not running, the external device determines if the queue is empty (step 708). If the queue is empty, the external device moves to the next application queue (step 710).

If the queue is not empty, the external device pushes the message in the queue into the respective application's buffer (step 708). The external device then moves to the next queue (step 710).

Process 700 continues in a loop monitoring the application queues for new inbound messages.

Figure 8:
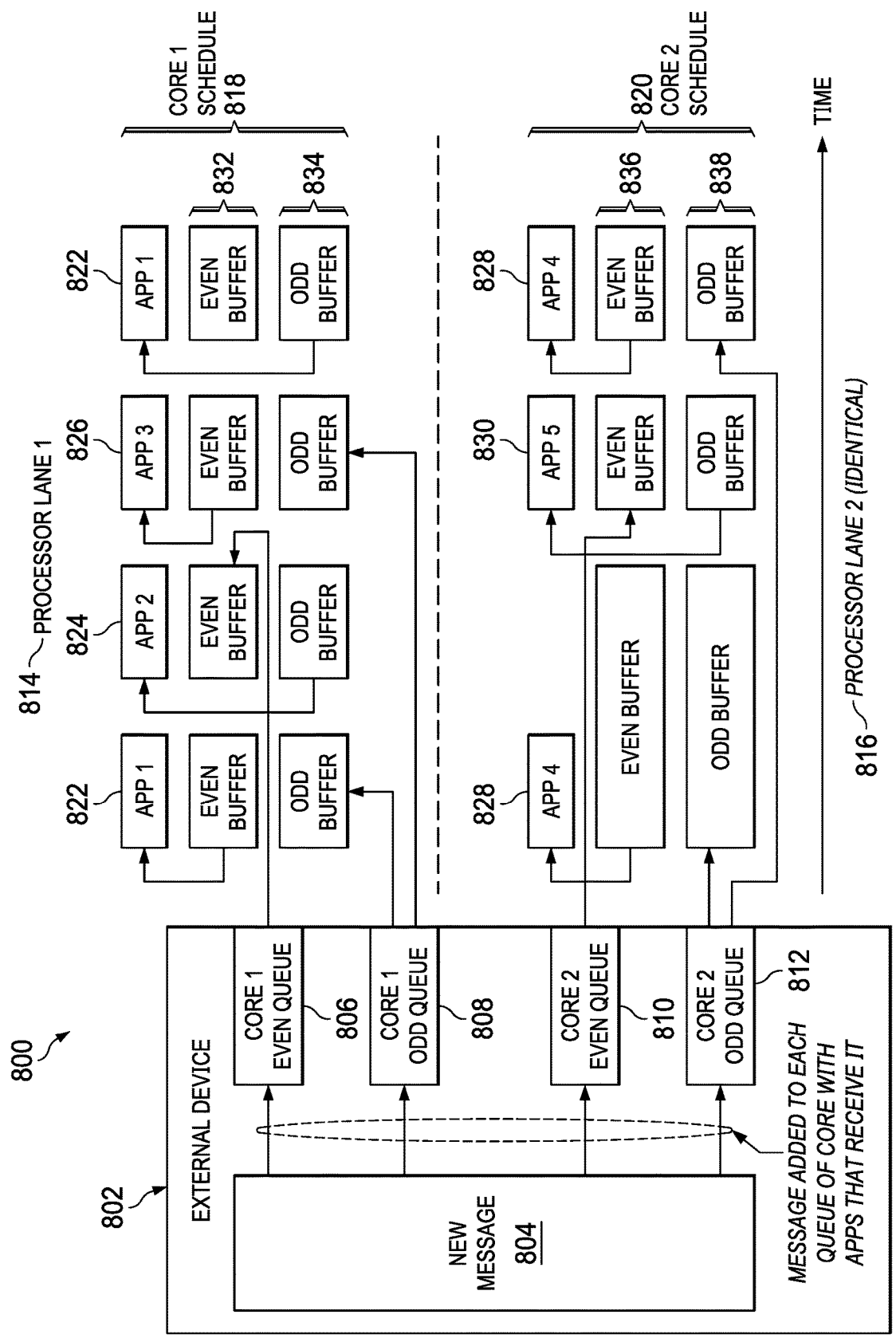
FIG. 8 illustrates a configuration for high integrity data processing of inbound messages using even and odd queues in accordance with an illustrative embodiment.

FIG. 8 illustrates a configuration for high integrity data processing of inbound messages using even and odd queues in accordance with an illustrative embodiment. Configuration 800 can be implemented in system 300 shown in FIG. 3.

In configuration 800, external device 802 comprises two message queues (even and odd) for each processor core. In the present example, there are five applications running across two multi-core processor lanes 814, 816. For ease of illustration only the core schedules of processor lane 1 814 are shown. Application 1 822, application 2 824, and application 3 826 are scheduled to run on core 1 818. Application 4 828 and application 5 830 are scheduled to run on core 2 820.

For additional ease of explanation, the present example also assumes applications 822-830 are all high integrity, and therefore identical core schedules are run concurrently on processor lane 2 816. However, it should be understood that only a subset of applications 1-5 might be high integrity applications running on both processor lanes 814, 816 and some applications might be standard integrity running only on processor lane 1 814, while other standard integrity applications (not shown) might run only on processor lane 2 816.

External device 802 comprises even queue 806 and odd queue 808 for core 1 818. External device 802 also comprises even queue 810 and odd queue 512 for core 2 820. Queues 806-812 might service both processor lane 1 814 and processors lane 2 816. Alternatively, external device 802 might also comprise separate core 1 and 2 even/odd queues for processor lane 2 816. Each processor core in turn has corresponding even and odd buffers. Core 1 818 comprises even buffer 832 and odd buffer 834. Similarly, core 2 820 comprises even buffer 836 and odd buffer 838.

When external device 802 receives new message 804, it adds redundant copies of the message to both the even and odd queues of each processor core running one or more applications that are meant to receive the message. External device 802 then pushes both copies of the message in the even and odd queues to the respective core buffers in an alternating manner. As the schedule of a processor core switches from one software partition/application to another the core toggles between the even and odd buffers. During even windows, software running on a core can only read the even buffer, while the external device 802 updates the odd buffer. Conversely, during odd windows, software can only read the off buffer, while the external device 802 updates the even buffer.

In the present example, for the core 1 818 external device 802 initially pushes a copy of new message 804 from odd queue 808 to odd buffer 834 while application 1 822 is reading from even buffer 832. In this instance, application 1 822 is reading a previous message from even buffer 832. When application 2 824 begins running, core 1 818 toggles buffers, and application 2 824 reads the new message 804 from odd buffer 834, allowing external device 802 to push a copy of message 804 from even queue 806 to even buffer 832.

When application 3 826 begins running, core 1 818 again toggles between buffers, and application 3 826 reads message 804 from even buffer 832. If a second message arrives while application 3 826 is reading even buffer 832, external device 802 pushes a copy of this second message from odd queue 808 to odd buffer 834.

When application 1 822 runs again, core 1 818 toggles between the buffers, and application 1 822 reads the newer second message from odd buffer 834.

Similarly, for the core 2 820 external device 802 initially pushes a copy of new message 804 from odd queue 812 to odd buffer 838 while application 4 828 is reading from even buffer 836. As with application 1 822 running on core 1 818, application 1 828 is reading a previous message during this time window. When application 5 830 begins running, core 2 820 toggles buffers, and application 2 830 reads the new message 804 from odd buffer 838, allowing external device 802 to push a copy of message 804 from even queue 810 to even buffer 836.

When application 4 828 runs again, core 2 820 toggles between the buffers, and application 4 828 reads message 804 from even buffer 836. As with core 1 818, if a newer second message arrives, external device 802 pushes a copy of this newer message from odd queue 812 to odd buffer 838 while application 4 828 reads from even buffer 836.

Queuing ports (e.g., original write and read position indicators) provide feedback to let external device 802 know if any of the queues 806, 808, 810, 812 overflow.

Figure 9:
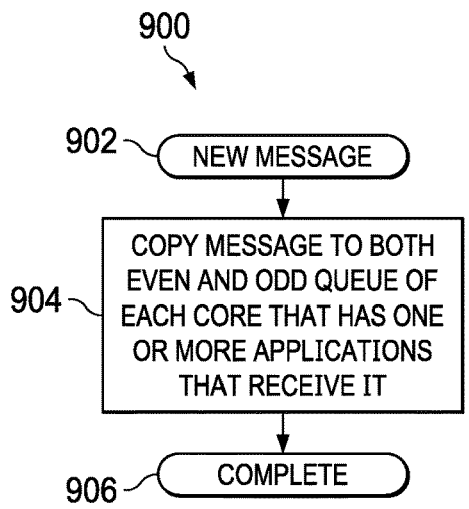
FIG. 9 illustrates a flowchart of a process for receiving a new message for high integrity data processing in accordance with an illustrative embodiment.

FIG. 9 illustrates a flowchart of a process for receiving a new message for high integrity data processing in accordance with an illustrative embodiment. Process 900 can be implemented by external device 802 in FIG. 8.

Process 900 begins with the external device receiving a new message from an external network/data bus (step 902). The external device then places a copy of the new message in both the even and odd queue for each processor core that has one or more applications that receive the message (step 904). Process 900 is then complete (step 906).

Figure 10:
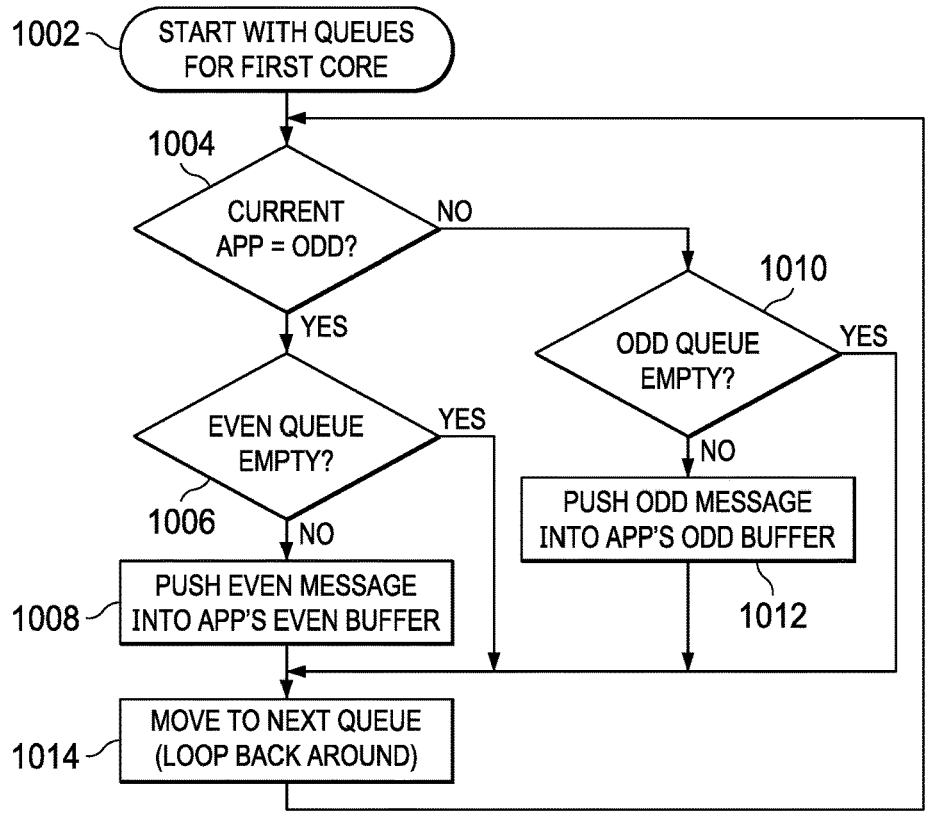
FIG. 10 illustrates a flowchart of a process for pushing a new message to even and odd core buffers for high integrity data processing in accordance with an illustrative embodiment.

FIG. 10 illustrates a flowchart for pushing a new message to even and odd core buffers for high integrity data processing in accordance with an illustrative embodiment. Process 1000 can be implemented by external device 802 in FIG. 8. External device 802 performs process 1000 concurrently for both processor lanes.

Process 1000 begins by the external device starting with the queue for the first processor core (step 1002) and determining if the application currently running (if any) is running during an odd time window (step 1004).

If the application in question is not odd (i.e., is running during an even window), the external device determines if the odd queue is empty (step 1010). If the odd queue is empty, the external processor moves to the next queue (step 1014). If the odd queue is not empty, the external device pushes the message in the odd queue into the application's odd buffer in the core (step 1012).

If the application is odd, the external device determines if the even queue is empty (step 1006). If the even queue is empty, the external device moves to the next queue (step 1014). If the even queue is not empty, the external device pushes the message in the even queue into the application's even buffer in the core (step 1008). The external device then moves to the next queue (step 1014).

Process 1000 continues in a loop monitoring the application queues for new inbound messages.

Figure 11:
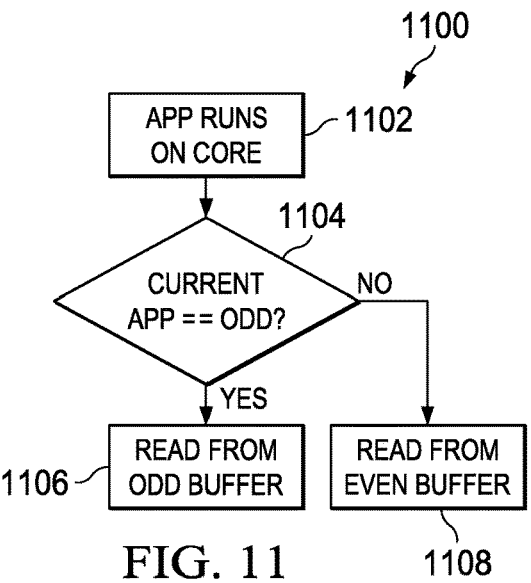
FIG. 11 illustrates a flowchart of a process for reading a new message from even and odd core buffers for high integrity data processing in accordance with an illustrative embodiment.

FIG. 11 illustrates a flowchart of a process for reading a new message from even and odd core buffers for high integrity data processing in accordance with an illustrative embodiment. Process 1100 can be implemented by processor lanes 814, 816 in FIG. 8. Process 1000 is performed concurrently by both processor lanes.

Process 1100 begins when an application begins running on a processor core (step 1102). The processor core determines if the application is running during odd time window (step 1104). If the application in question is not odd (i.e., is running during an even window), the application reads from the odd buffer (step 1106). If the application is odd, the application reads from the even buffer (step 1108).

Figure 12:
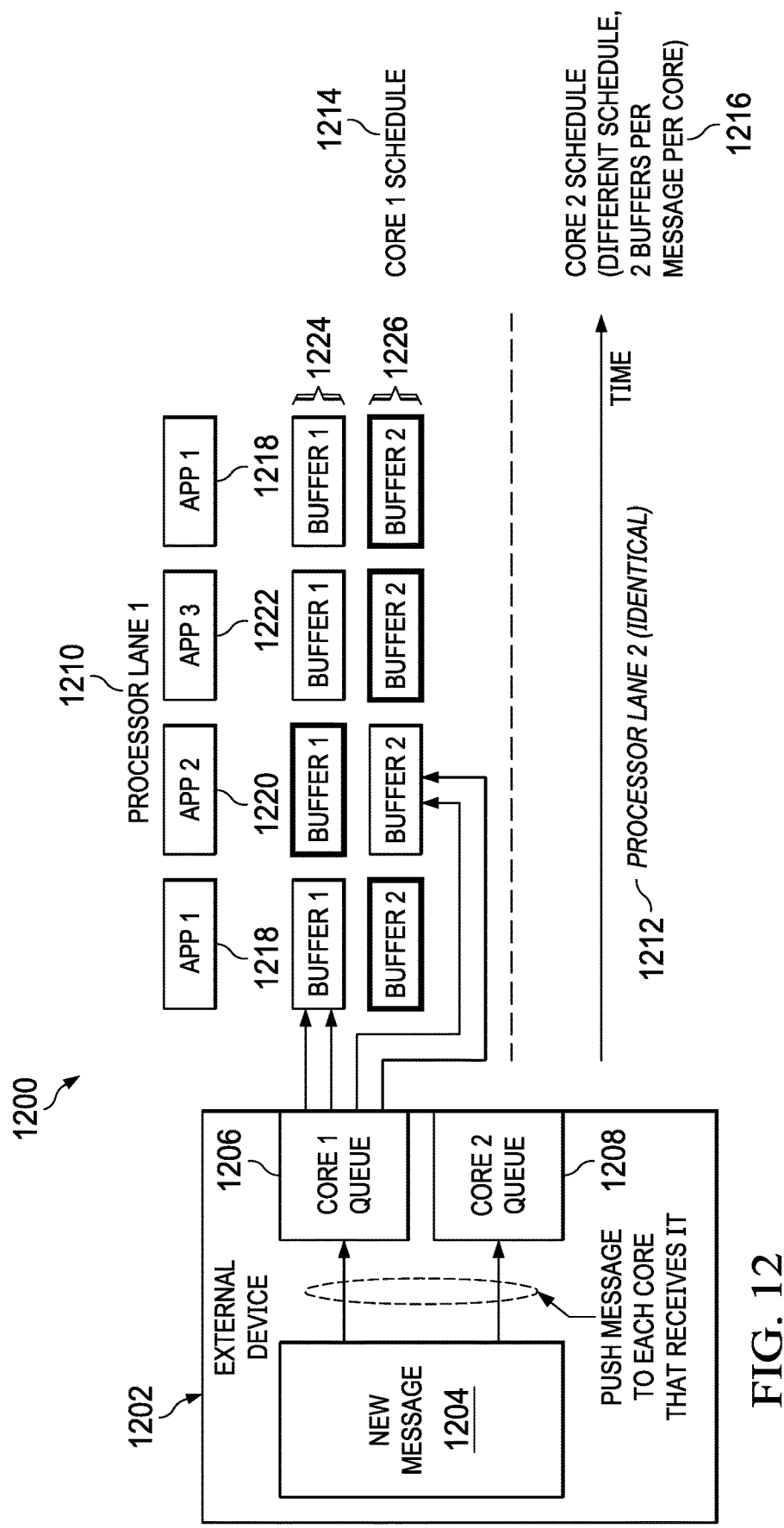
FIG. 12 illustrates a configuration for high integrity data processing of inbound messages using alternating core buffers in accordance with an illustrative embodiment.

FIG. 12 illustrates a configuration for high integrity data processing of inbound messages using alternating core buffers in accordance with an illustrative embodiment. Configuration 1200 can be implemented in system 300 shown in FIG. 3.

In configuration 1200, external device 1202 comprises a message queue for each processor core running one or more software partitions/applications that read a message. In the present example, processor lane 1 1210 comprises two processor cores 1214, 1216. Therefore, external device 1202 comprise core 1 queue 1206 and core 2 queue 1208.

Each processor core comprises two buffers for each message that applications running on that core receive. Core 1 1214 comprises buffer 1 1224 and buffer 2 1226. For ease of illustration only the schedule for core 1 1214 is shown.

Core 2 1216 has a different schedule than core 1 1214 but also has two buffers per message.

For ease of explanation, the present example also assumes processor lane 2 1212 comprises identical concurrent core schedules as processor lane 1 1210. Again, it should be understood that only a subset of applications might be high integrity applications running on both processor lanes 1210, 1212.

When external device 1202 receives new message 1204, it adds copies of the message to the queue of each processor core running one or more applications that are meant to receive the message. External device 1202 then pushes copies of the message in the queues to respective core buffers from which applications are not currently reading.

As the schedule of a processor core switches from one software partition to another the core toggles the buffers only if a new message was pushed from the external device 1202 while the previous software partition was running. If no new message arrived during the previous application time window, the next software partition does not change buffers.

In the present example, for the core 1 1214 external device 1202 initially pushes a copy of new message 1204 from core 1 queue 1206 to buffer 1 1224 while application 1 1218 is reading a previous message from even buffer 2 1226. If newer messages arrive while application 1 1218 is still reading from buffer 2 1226, the newer messages are written over older messages in buffer 1 1224. When application 2 1220 begins running, core 1 1214 toggles buffers, and application 2 1220 reads from buffer 1 1224, allowing external device 1202 to push a copy of message 1204 from core 1 queue 1206 to buffer 2 1226.

When application 3 1222, core 1 1214 again toggles between buffers, and application 3 1222 reads message 1204 from buffer 2 1226. However, in the present example another message does not arrive for external device 1202 to push to buffer 1 1224 while application 3 1222 is reading from buffer 2 1226.

Therefore, when application 1 1218 runs again core 1 1214 does not switch to buffer 1 1224 since no new messages arrived during the previous application time window. Therefore, application 1 1218 reads from buffer 2 1226.

Queuing ports (e.g., original write and read position indicators) provide feedback to let external device 1202 know if any of the queues 1206, 1208 overflow. The queuing ports read all messages that arrived before the start of a partition window.

Figure 13:
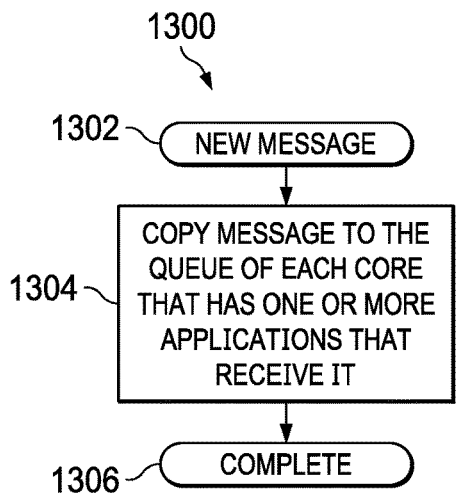
FIG. 13 illustrates a flowchart of a process for receiving a new message for high integrity data processing in accordance with an illustrative embodiment.

FIG. 13 illustrates a flowchart of a process for receiving a new message for high integrity data processing in accordance with an illustrative embodiment. Process 1300 can be implemented by external device 1202 in FIG. 12.

Process 1300 begins with the external device receiving a new message from an external network/data bus (step 1302). The external device then places a copy of the new message in the queue for each processor core that has one or more applications that receive the message (step 1304). Process 1300 is then complete (step 1306).

Figure 14:
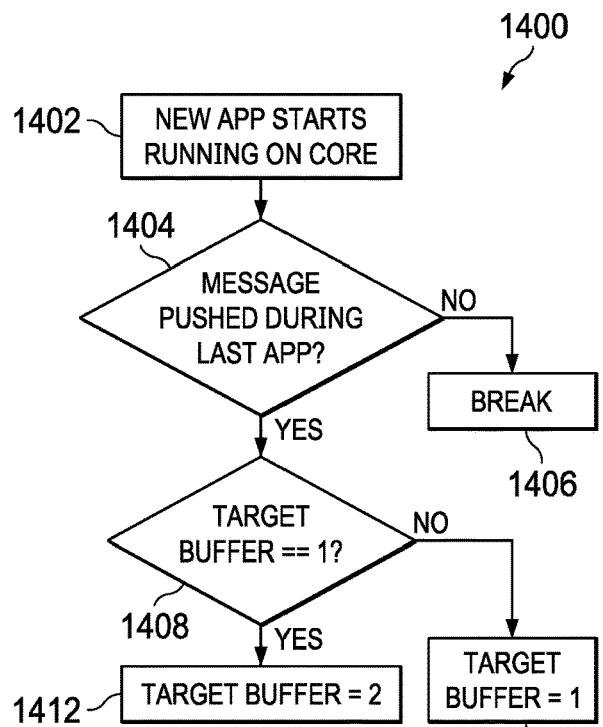
FIG. 14 illustrates a flowchart for determining a target core buffer for high integrity data processing in accordance with an illustrative embodiment.

FIG. 14 illustrates a flowchart for determining a target core buffer for high integrity data processing in accordance with an illustrative embodiment. Process 1000 can be implemented by external device 1202 in FIG. 12. External device 1202 performs process 1400 concurrently for both processor lanes.

Process 1400 begins when a new application begins running on a processor core (step 1402). The external device then determines if a message was pushed to a core buffer during the last application time window (step 1404). If a message was not pushed during the last application window, process 1400 breaks (step 1406).

If a message was pushed during the last application window, the external device determines if the target buffer for the last message was buffer 1 (step 1408). If the last target buffer was not buffer 1, the external device sets buffer 1 as the target buffer for the next message to be pushed (step 1410).

If the last target buffer was buffer 1, the external device sets buffer 2 as the target buffer for the next message to be pushed (step 1412).

Figure 15:
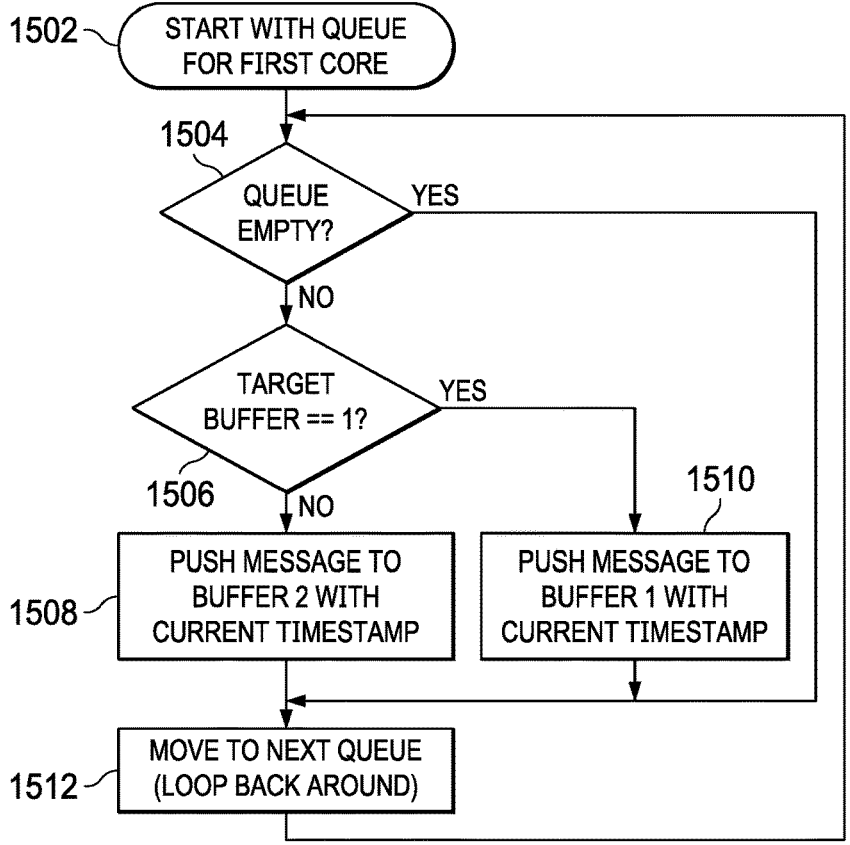
FIG. 15 illustrates a flowchart for pushing a new message to alternate core buffers for high integrity data processing in accordance with an illustrative embodiment.

FIG. 15 illustrates a flowchart for pushing a new message to alternate core buffers for high integrity data processing in accordance with an illustrative embodiment. Process 1500 can be implemented by external device 1202 in FIG. 12. External device 1202 performs process 1500 concurrently for both processor lanes.

Process 1500 begins by the external device starting with the queue for the first processor core (step 1502) and determining if the queue is empty (step 1504). If the queue is empty, the external processor moves to the next queue (step 1512).

If the queue is not empty, the external device determines if the target buffer in the core is buffer 1 (step 1506). If the target buffer is not buffer 1, the external device pushes the message queue into buffer 2 in the core (step 1508). The external device then moves to the next queue (step 1512). If the target buffer is buffer 1, the external device pushes the message queue into buffer 1 in the core (step 1508) and moves to the next queue (step 1512).

Process 1500 continues in a loop monitoring the application queues for new inbound messages.

Figure 16:
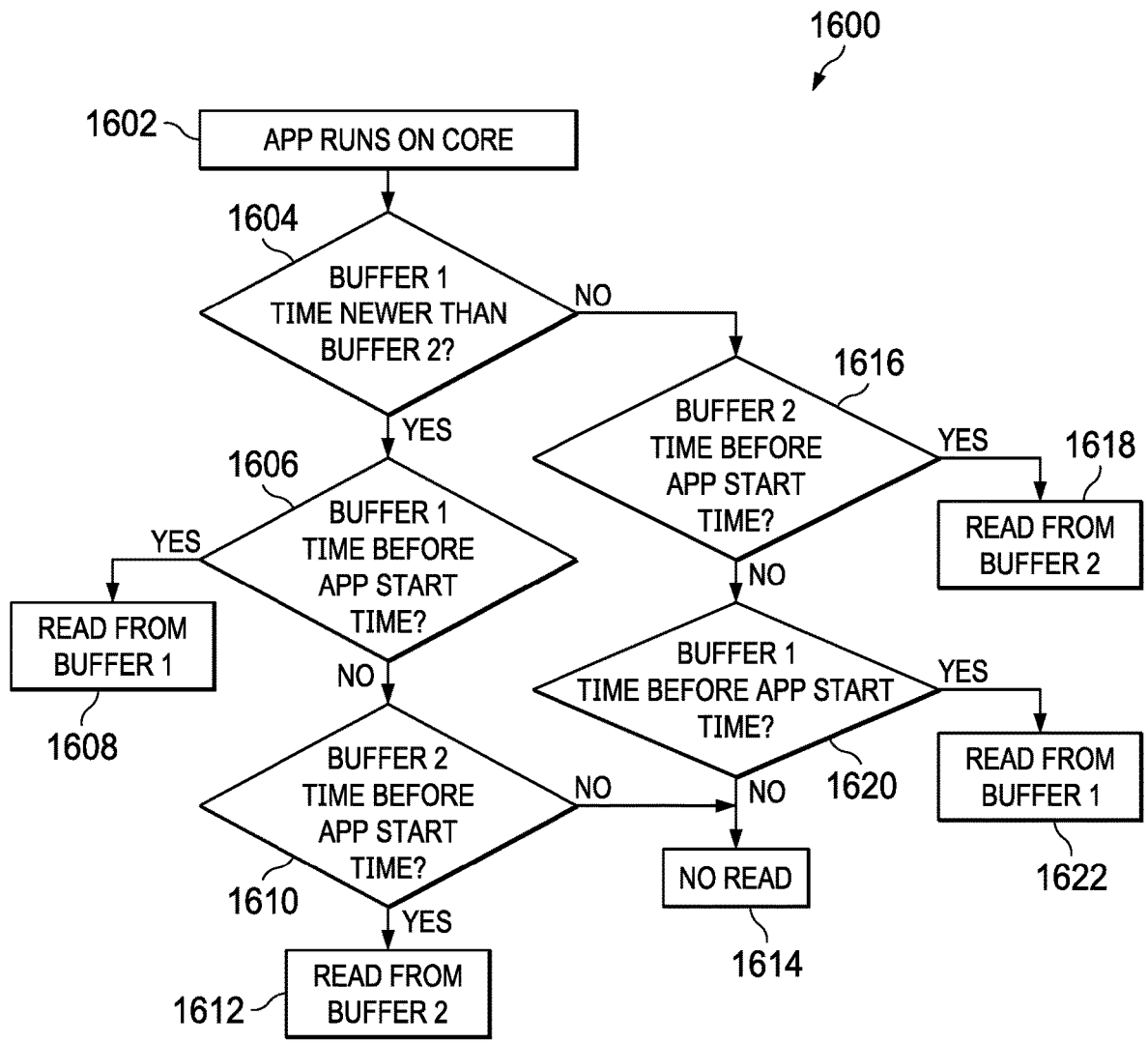
FIG. 16 illustrates a flowchart of a process for reading a new message from alternate core buffers for high integrity data processing in accordance with an illustrative embodiment.

FIG. 16 illustrates a flowchart of a process for reading a new message from alternate core buffers for high integrity data processing in accordance with an illustrative embodiment. Process 1600 can be implemented by processor lanes 1210, 1212 in FIG. 12. Process 1600 is performed concurrently by both processor lanes.

Process 1600 begins when an application begins running on a processor core (step 1602). The processor core determines if the message in buffer 1 is newer than the message in buffer 2 (step 1604).

If the message buffer 1 is newer than buffer 2 the processor core then determines if the message in buffer 1 arrived before the application started running (step 1606). If the message in buffer 1 did arrive before the application started running, the application reads from buffer 1 (step 1608). If the message in buffer 1 did not arrive before the application started running, the application determines if the message in buffer 2 arrived before the application started running (step 1610). If the message in buffer 2 did arrive before the application started running, the application reads from buffer 2 (step 1612). If the message in buffer 2 did not arrive before the application started running, no read is performed from either buffer (step 1614).

If the message buffer 1 is not newer than buffer 2 the processor core then determines if the message in buffer 2 arrived before the application started running (step 1616). If the message in buffer 2 did arrive before the application started running, the application reads from buffer 2 (step 1618). If the message in buffer 2 did not arrive before the application started running, the application determines if the message in buffer 1 arrived before the application started running (step 1620). If the message in buffer 1 did arrive before the application started running, the application reads from buffer 1 (step 1622). If the message in buffer 1 did not arrive before the application started running, no read is performed from either buffer (step 1614).

Figure 17:
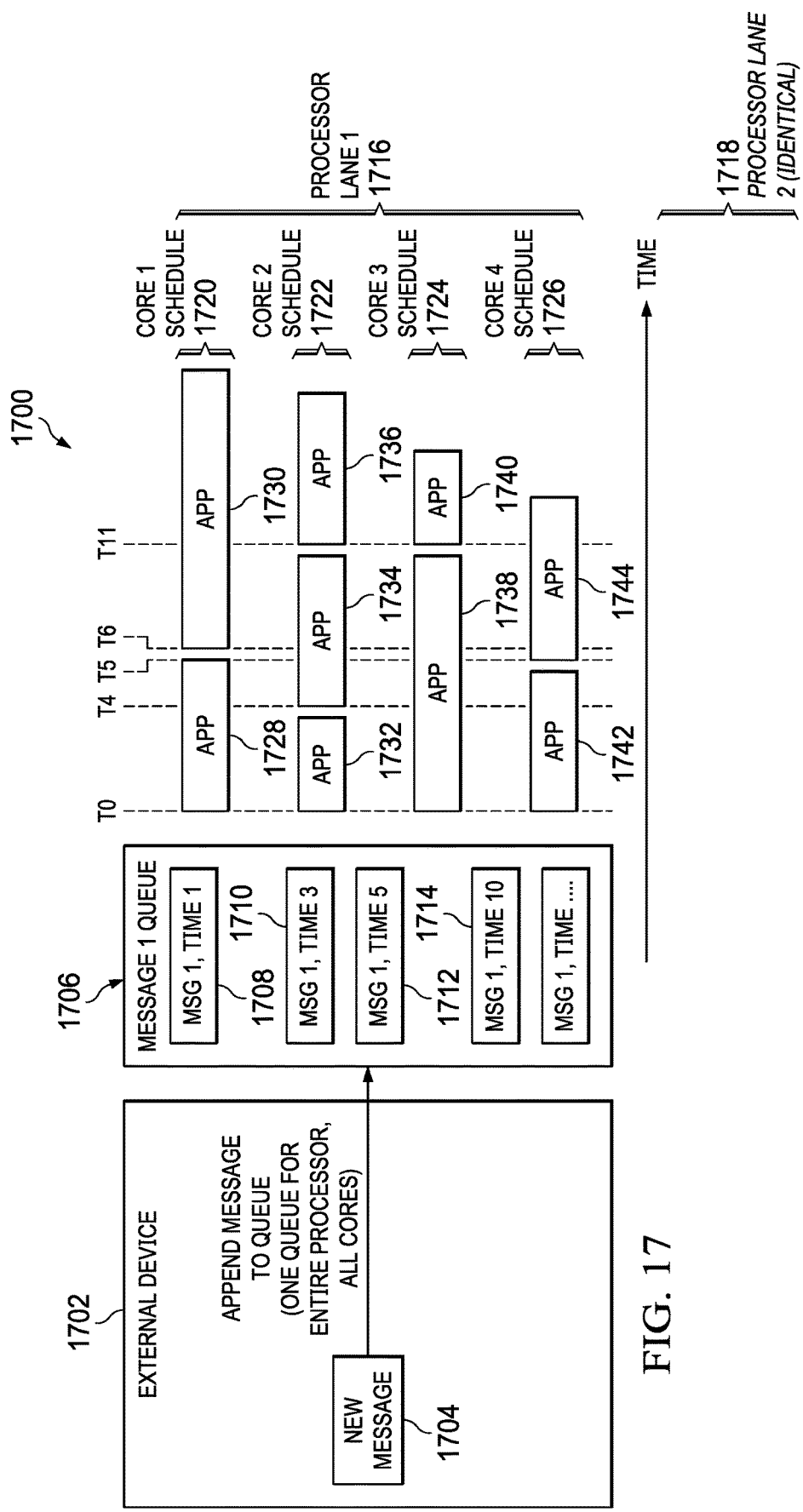
FIG. 17 illustrates a configuration for high integrity data processing of inbound messages using ring buffers in accordance with an illustrative embodiment.

FIG. 17 illustrates a configuration for high integrity data processing of inbound messages using ring buffers in accordance with an illustrative embodiment. Configuration 1700 can be implemented in system 300 shown in FIG. 3.

In configuration 1700, all messages are implemented in the processors as ring buffers that are shared across all cores and applications in a processor lane with one queue per message. The queues are sized based on the message arrival rate and the length of the longest application window that receives the message, because the queue maintains at least one copy of the message from before an application started running.

When a new message 1704 arrives, external device 1702 concurrently pushes the message to the respective message queues in both processor lanes and adds a timestamp to the message. Applications are allowed to read the newest message that arrived before the application started execution.

In the present example, processor lane 1 1716 and processor lane 2 1718 comprise four processing cores each. For ease of illustration only the core schedules of processor lane 1 1716 are shown, and it is assumed identical core schedules are run concurrently on processor lane 2 1718. Again, it should be understood that only a subset of applications might be high integrity applications running on both processor lanes 1716, 1718.

In the present example, applications 1728 and 1730 are scheduled to run on core 1 1720. Applications 1732, 1734, and 1736 are scheduled to run on core 2 1722. Applications 1738 and 1740 are scheduled to run on core 3 1724. Applications 1742 and 1744 are scheduled to run on core 4 1726.

FIG. 17 also depicts the respective scheduled starting times of each application. Applications 1728, 1732, 1738, and 1742 start at time T0. Application 1734 starts at time T4. Application 1744 starts at time T5. Application 1730 starts at time T6. Applications 1736 and 1740 start at time T11.

Message 1 queue 1706 contains several timestamped message 1 copies 1708, 1710, 1712, 1714. The timestamps of message 1 copies 1708, 1710, 1712, 1714 determine which applications are allowed to read them. An application is allowed to read the newest message 1 copy that arrived in queue 1706 before the application started running.

In the illustrated example, applications 1728, 1732, 1738, and 1742 cannot read any of the message 1 copies in queue 1706 because the applications start at time T0, and the newest message 1 copy 1708 is time stamped T1. Applications 1734 and 1744 would be allowed to read message 1 copy 1708 because they do not start until T4 and T5, respectively. However, by these points in time, message 1 copy 1708 is no longer the newest message 1 copy to arrive before applications 1734 and 1744 start running. Therefore, applications 1734 and 1744 read message 1 copy 1710, which arrived at time T3. Similarly, application 1730 reads message 1 copy 1712, which arrived at time T5, and applications 1736 and 1740 read message 1 copy 1714, which arrived at time T10.

Figure 18:
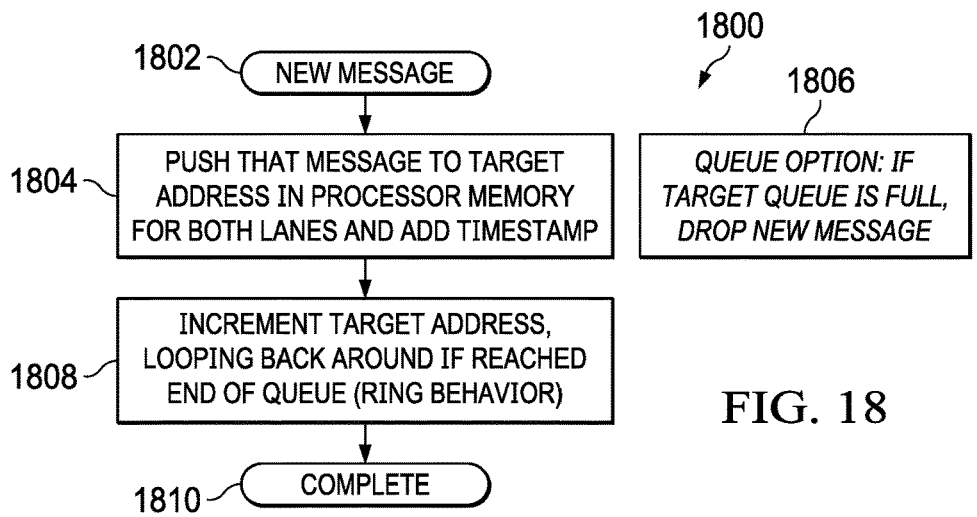
FIG. 18 illustrates a flowchart of a process for receiving a new message for high integrity data processing in accordance with an illustrative embodiment.

FIG. 18 illustrates a flowchart of a process for receiving a new message for high integrity data processing in accordance with an illustrative embodiment. Process 1800 can be implemented by external device 1702 in FIG. 17.

Process 1800 begins with the external device receiving a new message from an external network/data bus (step 1802). The external device pushes a copy of the new message to a target address in processor memory for both processor lanes and adds a timestamp to the message (step 1304). Optionally, if the target queue is full, the external device drops the new message (step 1806). The processor provides feedback to the external device on how full the queue is. Reading applications remove messages to clear space.

After the new message is pushed to the target address in memory, the external device increments the target address (step 1808). If the external device reaches the last memory address in the queue, it loops back to the beginning address (i.e., ring behavior).

Process 1800 is then complete (step 1810).

Figure 19:
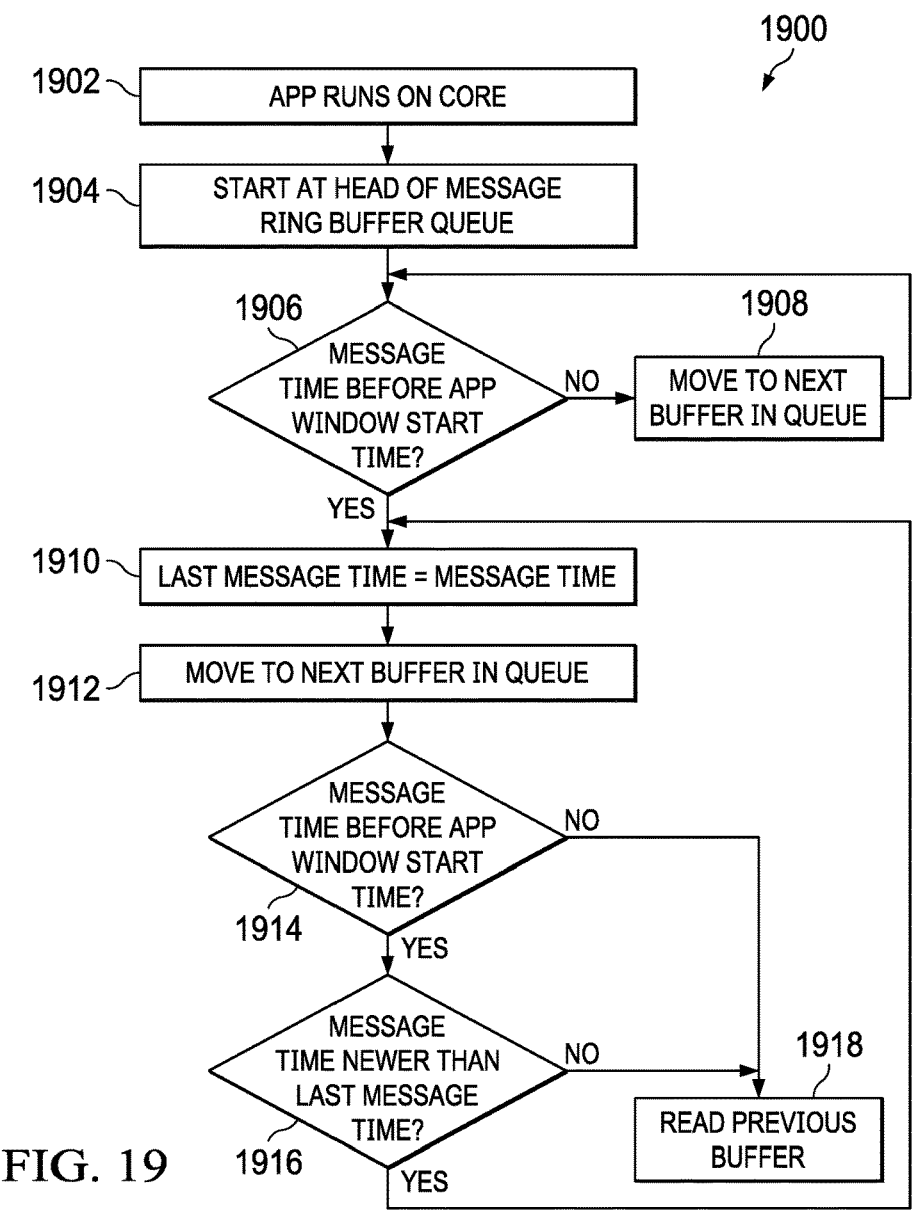
FIG. 19 illustrates a flowchart of a process for reading a new message from a ring buffer for high integrity data processing in accordance with an illustrative embodiment.

FIG. 19 illustrates a flowchart of a process for reading a new message from a ring buffer for high integrity data processing in accordance with an illustrative embodiment. Process 1900 can be implemented by processor lanes 1716, 1718 in FIG. 17. Process 1900 is one example of how an application reads the newest message to arrive before that applications starts. Process 1900 is performed concurrently by both processor lanes.

Process 1900 begins when an application begins running on a processor core (step 1902). The processor core starts at the head of the message ring buffer queue (step 1904) and determines if the message in the buffer has a timestamp before the application window start time (step 1906). If the message timestamp is not before the application start time, the processor core moves to the next buffer in the queue (step 1908) and repeats the same determination.

If the message in the buffer does have a timestamp before the application window start time, Last Message Time is set equal to the timestamp of the message (step 1910).

The processor core then moves to the next buffer in the queue (step 1912) and determines if the message in that buffer has a timestamp before the application window start time (step 1914). If the message in the next buffer does not have a timestamp before the application start time, the application reads the previous buffer (step 1918).

If the message in the next buffer does have a timestamp before the application start time, the processor core determines if the message in the next buffer also has a timestamp newer than the Last Message Time (step 1916). If the timestamp of the message in the next buffer is newer than Last Message Time, the processor core updates the Last Message Time be setting it equal to the timestamp of the message in the next buffer queue (step 1910).

If the timestamp of the message in the next buffer is not newer than Last Message Time, the application reads the previous buffer (step 1918).

Figure 20:
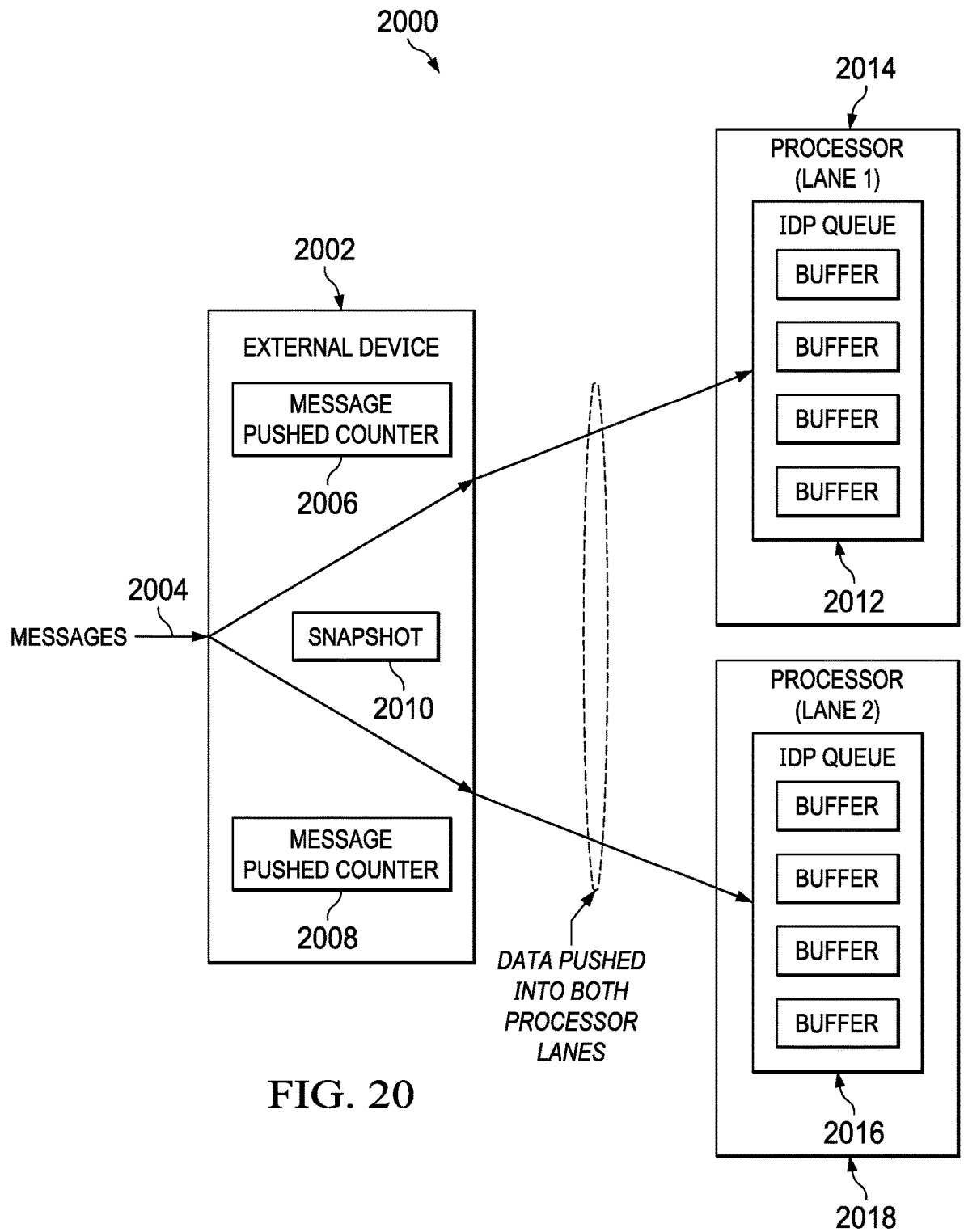
FIG. 20 illustrates a configuration for high integrity data processing of inbound messages in accordance with an illustrative embodiment.

FIG. 20 illustrates a configuration for high integrity data processing of inbound messages in accordance with an illustrative embodiment. Configuration 2000 can be implemented in system 300 shown in FIG. 3.

In configuration 2000, an inbound data distribution agent (Inbound Data Processor—"IDP") exists on each processor lane 2014, 2018 and has a corresponding queue 2012, 2016. The IDPs are scheduled to run in the same time slot on both lanes. External device 2002 synchronously pushes new messages 2004 to the respective IPD queues 2012, 2016 on each processor lane 2014, 2018.

The IDP begins each execution by reading a register in the external device 2002 for the number of new inbound messages in its queue. The IDP only reads the number of messages returned and distributes the messages to the software on its processor lane that receives them. Because of time skew due to multicore contention and/or variations in execution speed of different processors, one of the IDPs on the processor lanes will read the messages before the other. External device 2002 comprises message pushed counters 2006, 2008, each corresponding to one of the processor lanes 2014, 2018. The message push counter corresponding to the processor lane that reads the new messages first saves the count of new messages read by that processor lane. External device 2002 then returns a snapshot 2010 of that count to the slower processor lane to ensure that both processor lanes 2014, 2018 receive the same number of messages.

Alternatively, external device 2002 can place timestamps on the messages. In this arrangement, software is only allowed to read messages with timestamps older than the time when the software started executing, effectively serving as a time snapshot.

Figure 21:
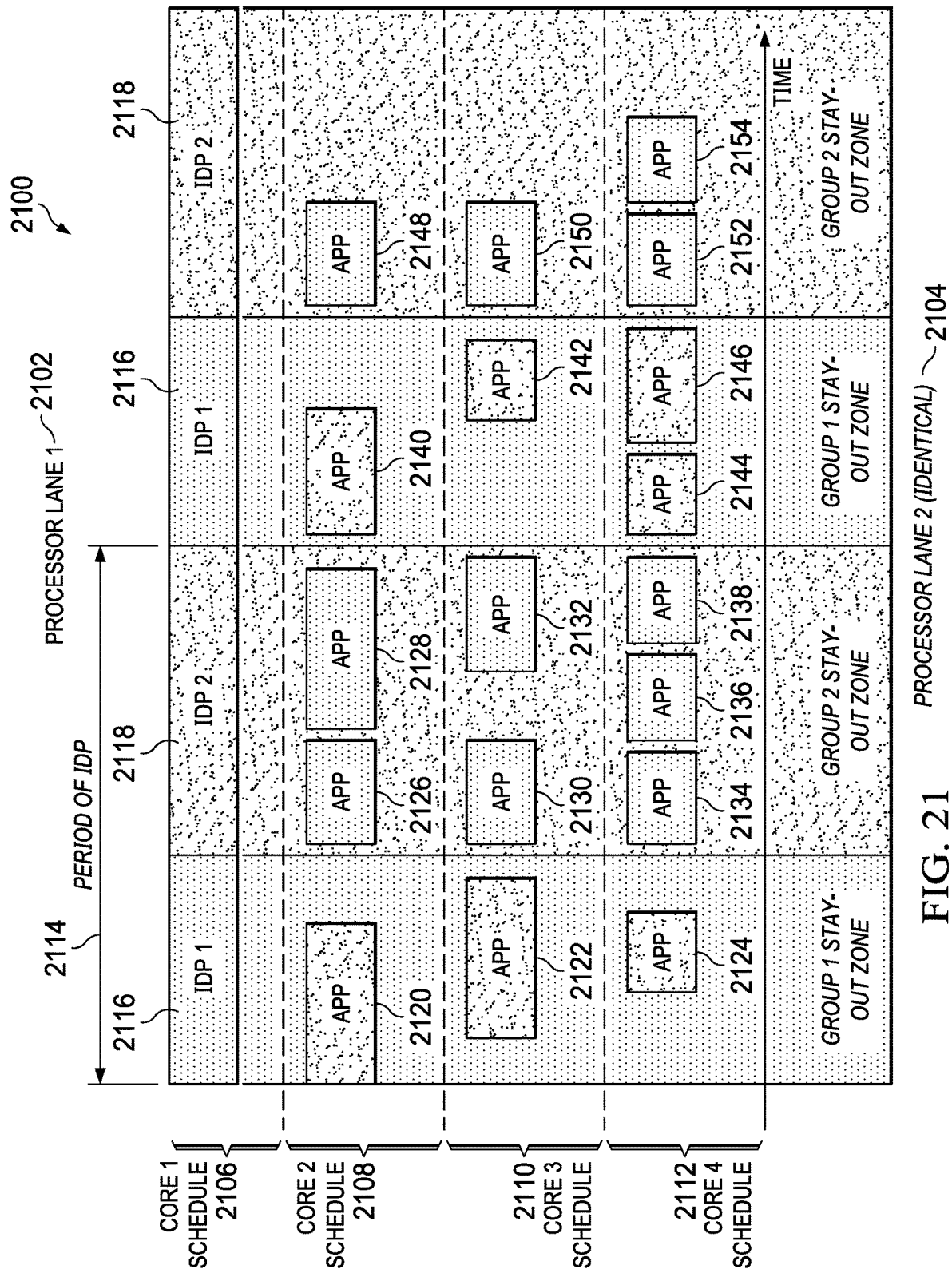
FIG. 21 illustrates a multi-core schedule for high integrity data processing in accordance with an illustrative embodiment.

FIG. 21 illustrates a multi-core schedule for high integrity data processing in accordance with an illustrative embodiment. Schedule 2100 can be implemented with configuration 2000 shown in FIG. 20.

For ease of illustration only the core schedules of processor lane 1 2102 are shown, and it is assumed identical core schedules are run concurrently on processor lane 2 2104. Once again, it should be understood that only a subset of the applications might be high integrity applications running on both processor lanes 2102, 2104. In the present example, processor lane 1 2102 comprises four cores 2106, 2108, 2110, and 2112.

In schedule 2100, each IDP time window can be divided into two or more IDPs. In the present example, IDP period 2114 is divided into IDP 1 2116 and IDP 2 2118.

Each IDP services a different set of receiving applications. In the present example, IDP 1 2116 distributes data to applications 2126, 2128, 2130, 2132, 2134, 2136, 2138, 2148, 2150, 2152, and 2154, which comprise Group 1. Similarly, IDP 2 2118 distributes data to applications 2120, 2122, 2124, 2140, 2142, 2144, and 2146, which comprise Group 2.

When each IDP 2116, 2118 time window starts, the IDP in question gets the new message count from the external device (i.e., external device 2002). The IDP then distributes that number of messages from the queue to the receiving applications. While an IDP is running, applications serviced by that IDP cannot run. For example, while IDP 1 2116 is running on core 1 2106, applications in Group 1 cannot run on cores 2-4 2108, 2110, and 2112, but applications in Group 2 can. Conversely, when IDP 2 2118 runs on core 1 2106, applications in Group 2 cannot run on the other cores, but applications in Group 1 can.

There can be any number of IDPs, wherein IDPs can be scheduled on different cores or even at overlapping times, as long as both processors have the same IDPs running at the same times. Multiple IDPs help lower latency and smooth message processing. Multiple IDPs also make it easier to schedule applications and line up harmonics between processor lanes. A message received by both groups of applications has to be processed by both IDPs.

Figure 22:
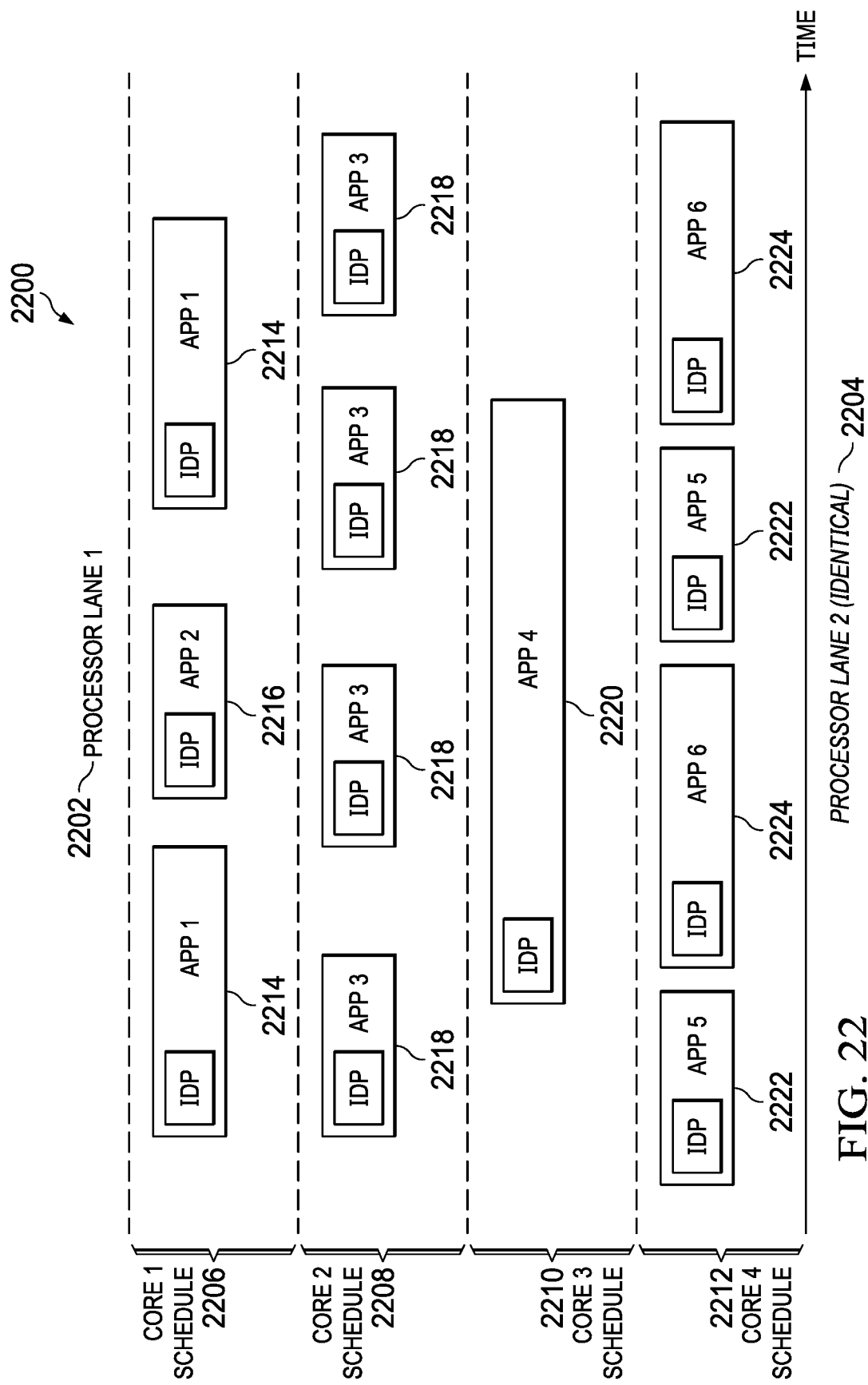
FIG. 22 illustrates a multi-core schedule for high integrity data processing in accordance with an illustrative embodiment.

FIG. 22 illustrates a multi-core schedule for high integrity data processing in accordance with an illustrative embodiment. Schedule 2200 can be implemented with configuration 2000 shown in FIG. 20.

For ease of illustration only the core schedules of processor lane 1 2202 are shown, and it is assumed identical core schedules are run concurrently on processor lane 2 2204. Again, it should be understood that only a subset of the applications might be high integrity applications running on both processor lanes 2202, 2204. In the present example, processor lane 1 2202 comprises four cores 2206, 2208, 2210, and 2212.

In the embodiment shown in FIG. 22, each application 2214, 2216, 2218, 2220, 2222, and 2224 includes its own embedded IDP that executes whenever the application starts running. The embedded IDP is the first thing the application does and gets the new message count from the external entity (i.e., external device 2002). Each application also has its own IDP queue.

The external device pushes a message to the IDP queue of every application that receives that message, which is done concurrently for both processor lanes. The external device maintains a snapshot of the behavior for each application, allowing alignment of messages the application reads on both processor lanes.

FIGS. 23-27 illustrate alternative ways outbound messages from high integrity processing across multiple processors can be synchronized and compared.

Figure 23:
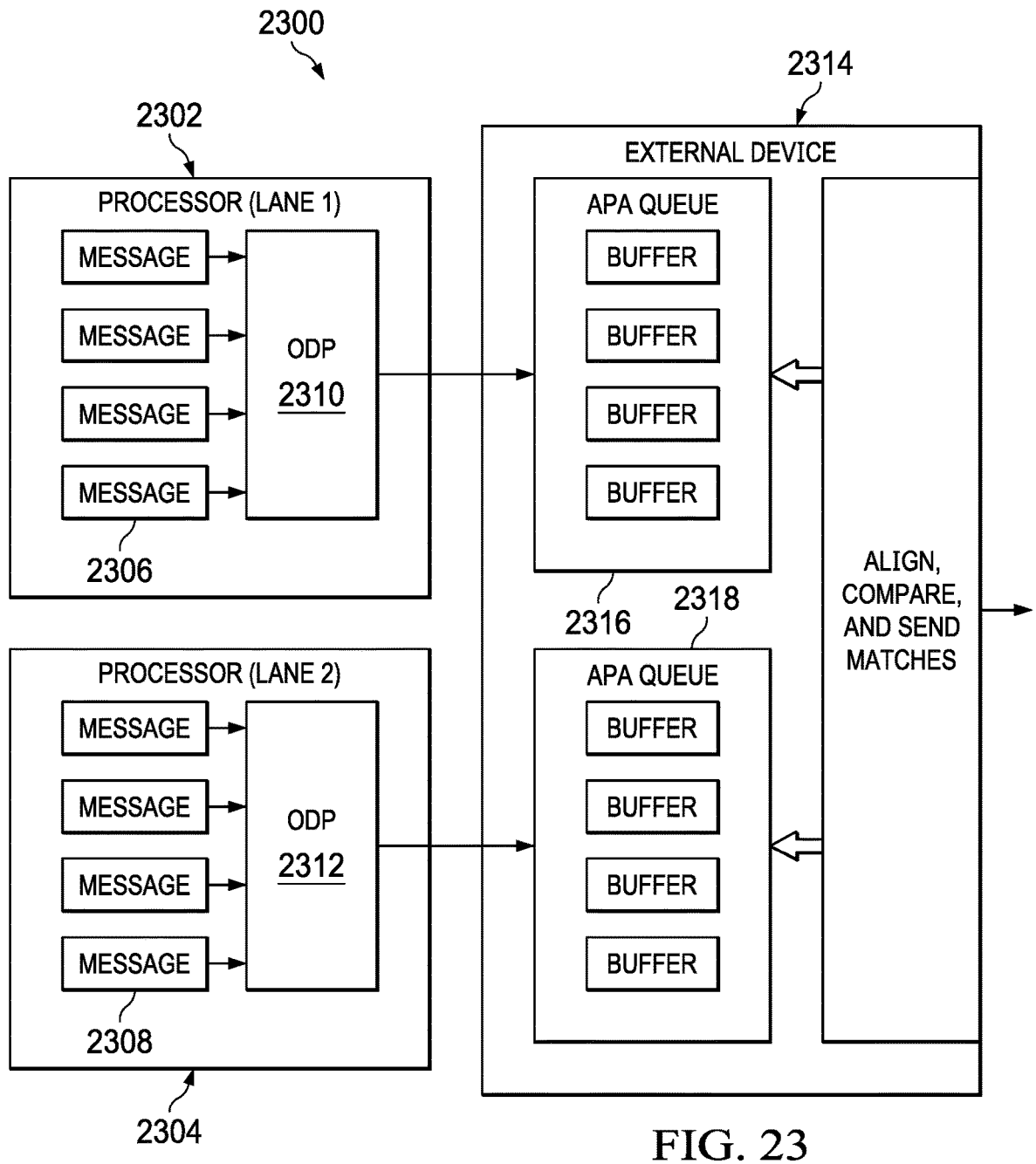
FIG. 23 illustrates a configuration for synchronizing outbound messages of high integrity data processing in accordance with an illustrative embodiment.

FIG. 23 illustrates a configuration for synchronizing outbound messages of high integrity data processing in accordance with an illustrative embodiment. Configuration 2300 can be implemented in system 300 shown in FIG. 3.

In configuration 2300, an output data distribution agent (Outbound Data Processor—"ODP") 2310, 2312 exists on each processor lane 2302, 2304. Software running on processor lanes 2302, 2304 writes data 2306, 2308 to buffers of ODPs 2310, 2312. The software does not need to wait for the slower lane to catch before sending output, making execution more efficient.

ODPs 2310, 2312 run periodically and transfer received messages to respective alignment queues 2316, 2318 on external device 2314 corresponding to each processor lane 2302, 2304. External device 2314 might be the same external device that receives and pushes new inbound messages to the processor lanes or a different external device. ODPs 2310, 2312 only transfer outbound messages received from software after the last OPD window and before the new OPD window. Alignment queues 2316, 2318 can feed back their available depths (queue space), allowing the ODPs 2310, 2312 to throttle message transfers in order to prevent processor lane time skew from causing alignment queue overflows. In configuration 2300, ODPs 2310, 2312 have sole access rights to push messages to external device 2314, ensuring software applications cannot interfere with each other or the external device 2314.

External device 2314 aligns equivalent outbound messages in the alignment queues 2316, 2318. The equivalence between messages can be determined by metadata such as, e.g., ID tags, sequence numbers. External device 2314 compares all the data in the aligned messages to make sure they match (i.e., both processor lanes 2302, 2304 produced the same calculation in response to the same inbound message). Matched (paired) messages are forwarded to a network/data bus. If equivalent outbound messages do not match (i.e., their data differs), or if there is a timeout before one of the equivalent messages in a pair arrives (i.e., too much time skew between processor lanes), the unmatched messages are discarded by the external device 2314.

Figure 24:
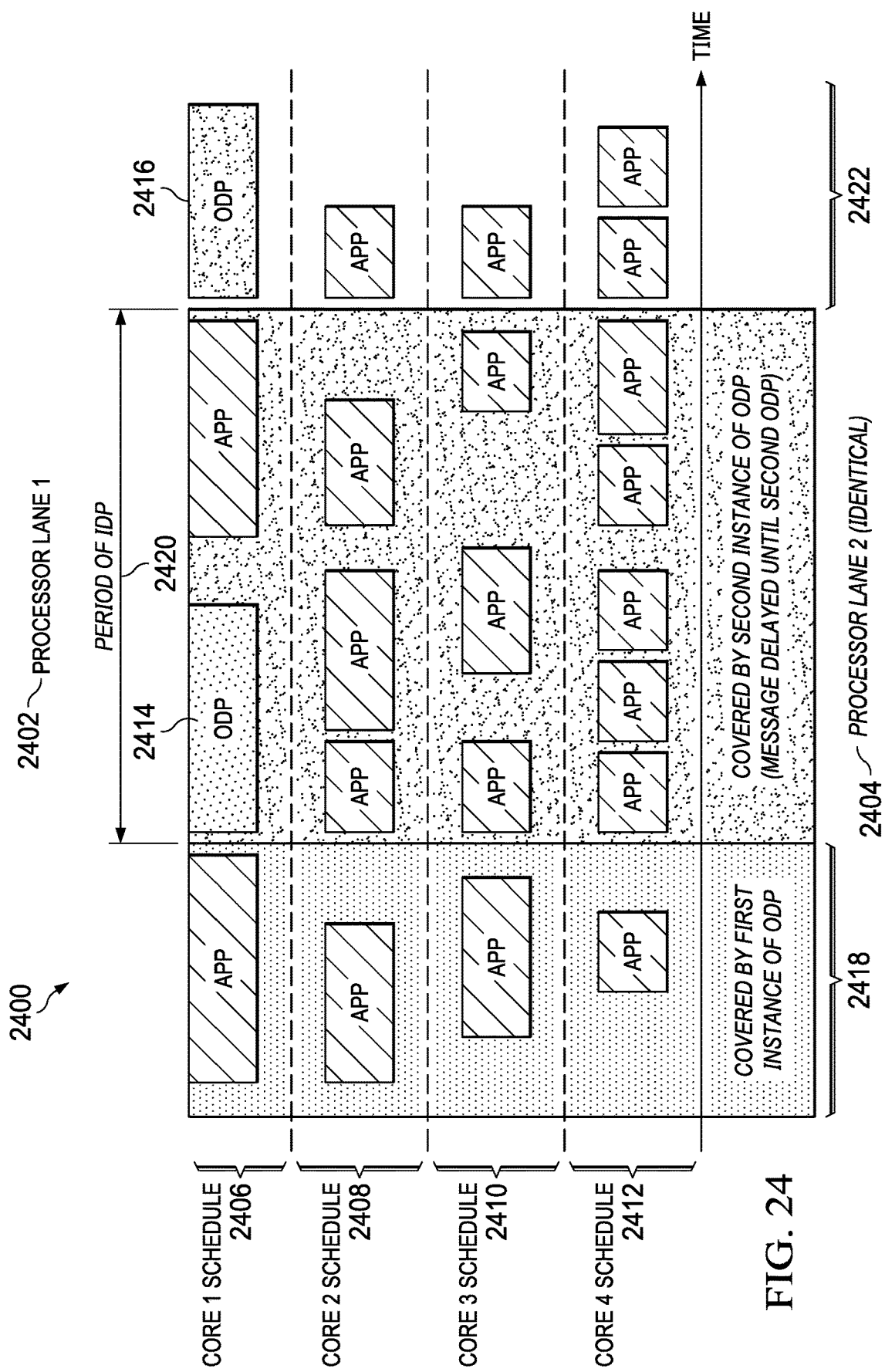
FIG. 24 illustrates a multi-core schedule high integrity data processing output in accordance with an illustrative embodiment.

FIG. 24 illustrates a multi-core schedule high integrity data processing output in accordance with an illustrative embodiment. Schedule 2400 can be implemented with configuration 2300 shown in FIG. 23.

For ease of illustration only the core schedules of processor lane 1 2402 are shown, and it is assumed identical core schedules are run concurrently on processor lane 2 2404. As with the previous examples, it should be understood that only a subset of the applications might be high integrity applications running on both processor lanes 2402, 2404. In the present example, processor lane 1 2402 comprises four cores 2406, 2408, 2410, and 2412.

In the example shown in FIG. 24, schedule 2400 comprises two ODP instances. Each ODP instance 2414, 2416 services a different time window, wherein a given ODP instance only receives messages from applications that run in a time window before that ODP instance began. In the present example, the first ODP instance 2414 only receives messages from applications that ran during time window 2420 before ODP instance 2414 begins. All messages from applications running during time window 2420, after first ODP instance 2414 starts, are delayed until the second ODP instance 2416 starts.

Similarly, when the second ODP instance 2416 begins, it only receives messages from applications that ran during time window 2420 and does not receive messages from applications running during time window 2422 after ODP instance 2416 starts. Second ODP instance 2416 also does not receive messages from applications that ran during time window 2418 because those messages were already covered by first ODP instance 2414.

As with IPDs, multiple ODPs help lower latency and smooth message processing. Multiple ODPs also make it easier to schedule applications and line up harmonics between processor lanes.

Figure 25:
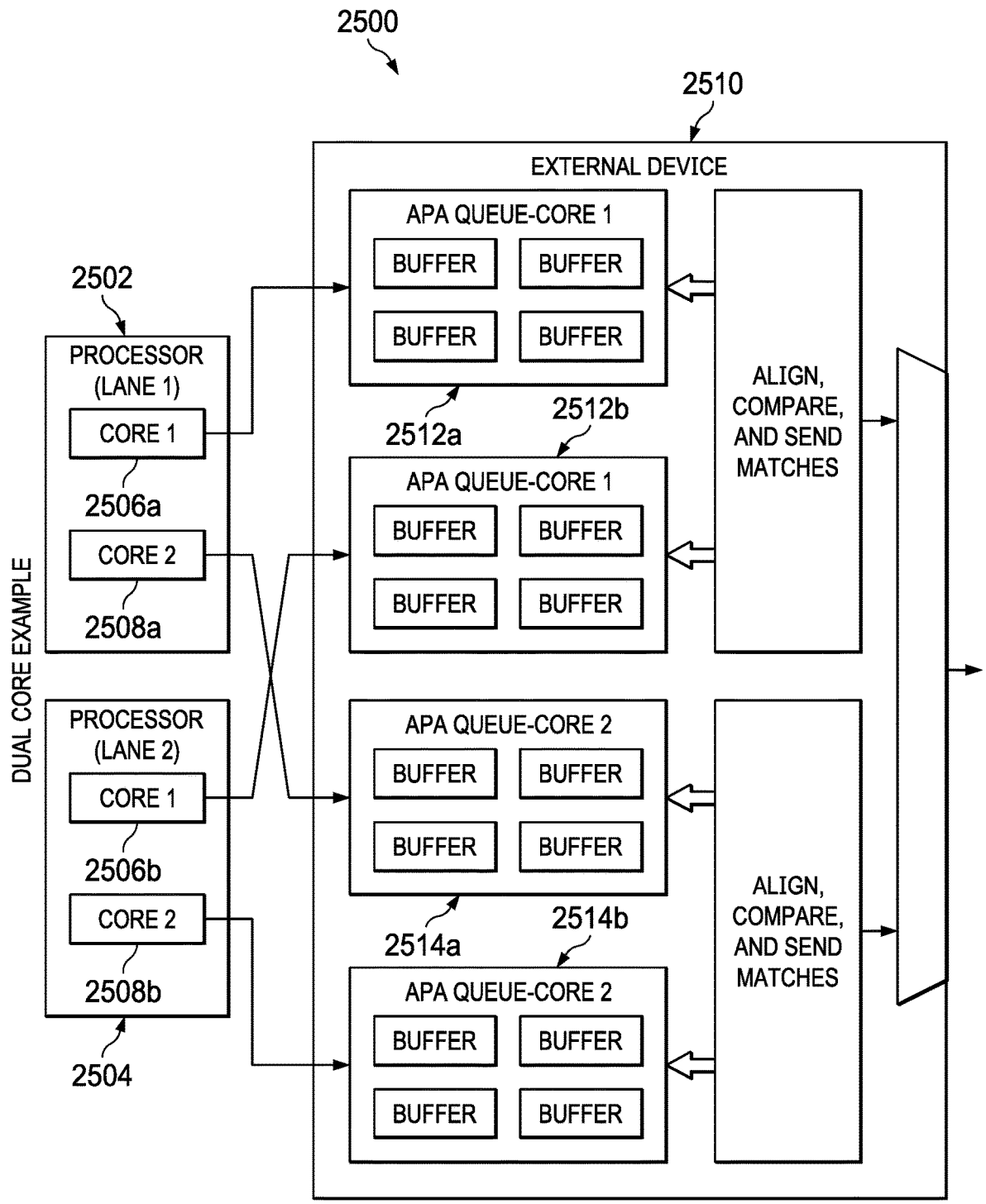
FIG. 25 illustrates a configuration for synchronizing outbound messages of high integrity data processing in accordance with an illustrative embodiment.

FIG. 25 illustrates a configuration for synchronizing outbound messages of high integrity data processing in accordance with an illustrative embodiment. Configuration 2500 can be implemented in system 300 shown in FIG. 3.

In configuration 2500, cores in the processor lanes push their outbound messages directly to the external device 2510 without the need of an ODP or the use of delays or keep-out time windows. External device 2510 might be the same external device that receives and pushes new inbound messages to the processor lanes or a different external device.

External device 2510 comprises alignment queues for corresponding cores in processor lanes 2502, 2504. In the present dual-core example, alignment queue 2512a receives messages directly from core 1 2506a in processor lane 1 2502, and alignment queue 2512b receives messages from core 1 2506b in processor lane 2 2504. Similarly, alignment queue 2514a receives messages directly from core 2 2508a in processor lane 1 2502, and alignment queue 2514b receives messages from core 2 2506b in processor lane 2 2504. If the processor lanes 2502, 2504 were to comprise more cores (e.g., four), the external device 2510 would include additional alignment queues corresponding to each of those cores.

External device 2510 aligns equivalent outbound messages in the alignment queues 2512a/2512b, 2514a/2514b according to common core numbers. Outbound messages from core 1 2506a are aligned with messages from core 1 2506b, and messages from core 2 2508a are aligned with messages from core 2 2508b.

Again, the equivalence between messages can be determined by metadata such as, e.g., ID tags, sequence numbers. External device 2510 compares all the data in the aligned messages to make sure they match (i.e., both processor lanes 2502, 2504 produced the same calculation in response to the same inbound message). Matched (paired) messages are forwarded to a network/data bus. If equivalent outbound messages do not match (i.e., their data differs), or if there is a timeout before one of the equivalent messages in a pair arrives (i.e., too much time skew between processor lanes), the unmatched messages are discarded by the external device 2510.

Alignments queues 2512a/2512b, 2514a/2514b use timeouts to prevent applications from interfering with each other.

Figure 26:
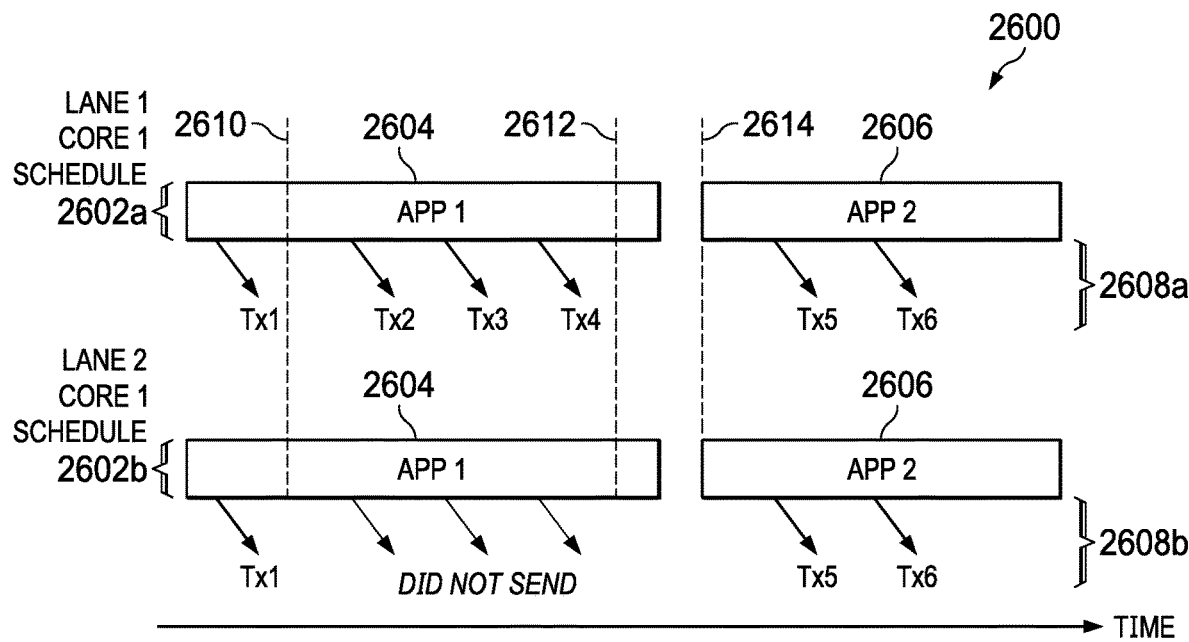
FIG. 26 illustrates the problem of unmatched outbound messages pushed directly to an external alignment entity.

FIG. 26 illustrates the problem of unmatched outbound messages pushed directly to an external alignment entity. Partitioning process 2600 might arise in configuration 2500 shown in FIG. 25.

As each application runs on corresponding processors cores, it sends outbound messages directly to alignment queues in an external device corresponding to the core. In the present example, application 1 2604 runs simultaneously on core 1 2602a and core 1 2602b in different processors lanes, and it sends messages to core 1 alignment queues 2608a, 2608b.

Each alignment queue has a maximum depth. As outbound messages from the processor lanes are matched in the alignment queues, they are sent by the external device to a network/data bus to prevent the queue from overflowing. In the present example, the alignment queues 2608a, 2608b have a depth of three messages, but other queue depths can be used with the illustrative embodiments.

In the example shown in FIG. 26, application 1 2604 sends message Tx1 from both lane 1 core 1 2602a and lane 2 core 1 2602b to respective alignment queues 2608a, 2608b. At time 2610, the matched Tx1 messages from both processor lanes are sent to the network/data bus, thereby clearing the queue.

However, when messages Tx2, Tx3, and Tx4 arrive in alignment queue 2608a from lane 1 core 1 2602a, they are not matched by equivalent messages from lane 2 core 1 2602b. At time 2612, the alignment queue for lane 1 is full, but the queue for lane 2 is still empty. Since unmatched messages cannot be sent to the network for high integrity applications, application 2 2606 running on lane 1 core 1 2602a is not able to send any messages because queue 2608a is still filled with unmatched messages from application 1 2604.

Therefore, when a new application starts running on a core, the alignment queue for that core must be emptied (flushed) of any unmatched messages from the previous application to maintain coherency between processor lanes. This emptying of the queue prevents software from filling up the alignment queue and thereby preventing subsequent software partitions from sending data to the queue.

After flushing the unmatched messages from alignment queue 2608a, the external device can report application 1 2604 to the health management functions of the processor.

Figure 27:
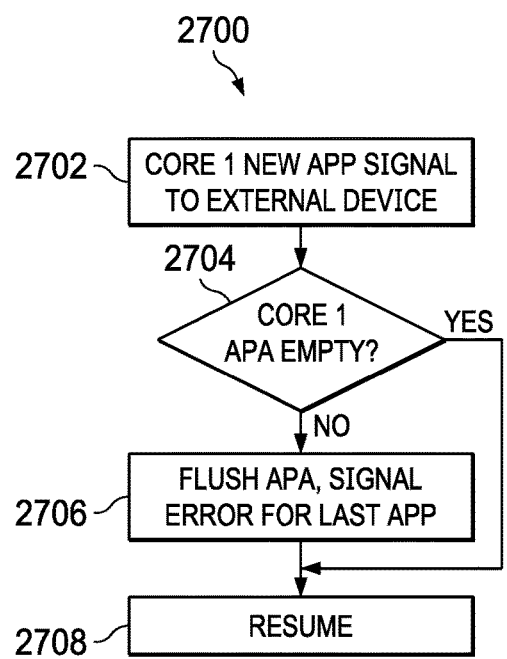
FIG. 27 illustrates a flowchart of a process for partitioning outbound messages of high integrity data processing in accordance with an illustrative embodiment.

FIG. 27 illustrates a flowchart of a process for partitioning outbound messages of high integrity data processing in accordance with an illustrative embodiment. Process 2700 can be implemented in configuration 2500 shown in FIG. 25. Process 2700 provides a solution to the problem of unmatched messages illustrated in FIG. 26 by preventing software applications from filling up the alignment queues in the external device, which would result in interference between applications.

Process 2700 begins by the external device receiving a signal from a new application running on a processor core (step 2702). The external device then determines if the alignment queue for the core is empty (step 2704). If the queue is empty, the new application continues (step 2708).

If the alignment queue is not empty, the external device flushes the queue and sends a signal error for the last application (step 2706). The new application then resumes (step 2708).

Figure 28:
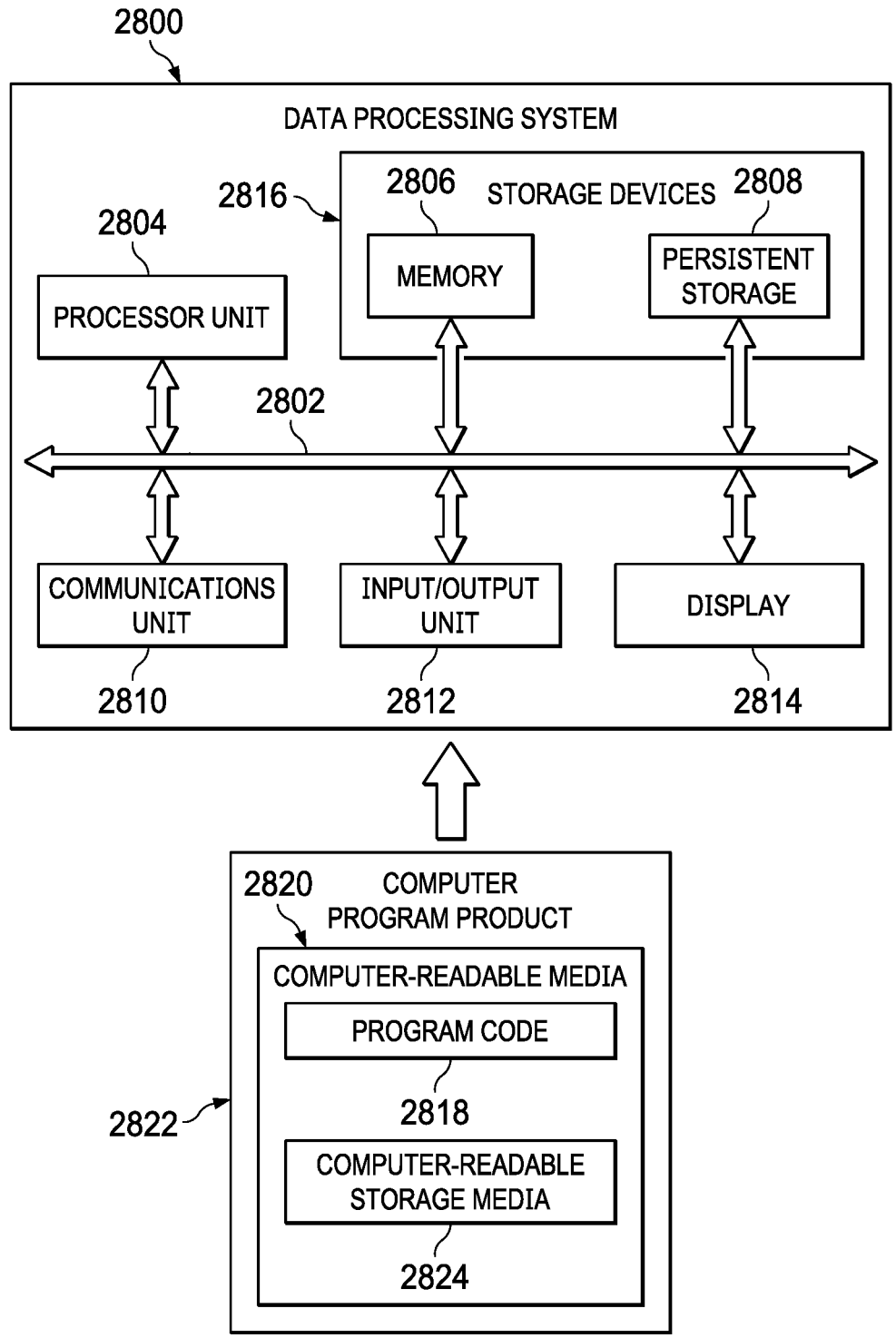
FIG. 28 is an illustration of a block diagram of a data processing system in accordance with an illustrative embodiment.

Turning now to FIG. 28, an illustration of a block diagram of a data processing system is depicted in accordance with an illustrative embodiment. Data processing system 2800 may be used to implement computer system 110 and external node 116 of FIG. 1. In this illustrative example, data processing system 2800 includes communications framework 2802, which provides communications between processor unit 2804, memory 2806, persistent storage 2808, communications unit 2810, input/output (I/O) unit 2812, and display 2814. In this example, communications framework 2802 may take the form of a bus system.

Processor unit 2804 serves to execute instructions for software that may be loaded into memory 2806. Processor unit 2804 may be a number of processors, a multi-processor core, or some other type of processor, depending on the particular implementation.

Memory 2806 and persistent storage 2808 are examples of storage devices 2816. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 2816 may also be referred to as computer-readable storage devices in these illustrative examples. Memory 2806, in these examples, may be, for example, a random-access memory or any other suitable volatile or non-volatile storage device. Persistent storage 2808 may take various forms, depending on the particular implementation.

For example, persistent storage 2808 may contain one or more components or devices. For example, persistent storage 2808 may be a hard drive, a solid state hard drive, a flash memory, a rewritable optical disk, a rewritable magnetic tape, or some combination of the above. The media used by persistent storage 2808 also may be removable. For example, a removable hard drive may be used for persistent storage 2808.

Communications unit 2810, in these illustrative examples, provides for communications with other data processing systems or devices. In these illustrative examples, communications unit 2810 is a network interface card.

Input/output unit 2812 allows for input and output of data with other devices that may be connected to data processing system 2800. For example, input/output unit 2812 may provide a connection for user input through at least one of a keyboard, a mouse, or some other suitable input device. Further, input/output unit 2812 may send output to a printer. Display 2814 provides a mechanism to display information to a user.

Instructions for at least one of the operating system, applications, or programs may be located in storage devices 2816, which are in communication with processor unit 2804 through communications framework 2802. The processes of the different embodiments may be performed by processor unit 2804 using computer-implemented instructions, which may be located in a memory, such as memory 2806.

These instructions are referred to as program code, computer usable program code, or computer-readable program code that may be read and executed by a processor in processor unit 2804. The program code in the different embodiments may be embodied on different physical or computer-readable storage media, such as memory 2806 or persistent storage 2808.

Program code 2818 is located in a functional form on computer-readable media 2820 that is selectively removable and may be loaded onto or transferred to data processing system 2800 for execution by processor unit 2804. Program code 2818 and computer-readable media 2820 form computer program product 2822 in these illustrative examples. In the illustrative example, computer-readable media 2820 may be computer-readable storage media 2824. In these illustrative examples, computer-readable storage media 2824 is a physical or tangible storage device used to store program code 2818 rather than a medium that propagates or transmits program code 2818.

Alternatively, program code 2818 may be transferred to data processing system 2800 using a computer-readable signal media. The computer-readable signal media may be, for example, a propagated data signal containing program code 2818. For example, the computer-readable signal media may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 2800 are not meant to provide architectural limitations to the manner in which different embodiments may be implemented. The different illustrative embodiments may be implemented in a data processing system including components in addition to or in place of those illustrated for data processing system 2800. Other components shown in FIG. 28 can be varied from the illustrative examples shown. The different embodiments may be implemented using any hardware device or system capable of running program code 2818.

One or more technical solutions are present that overcome a technical problem with obtaining desired efficiency in redundancy for processing data using processor units. As a result, one or more technical solutions can increase efficiency in processing data by processor units. For example, one or more technical solutions may enable at least one of aligning the timing in the processing data or processing messages by processor units operating in a high integrity mode. As a result, the processor units can process data using a high integrity mode, a standard integrity mode, or some combination thereof either separately or at substantially the same time.

As used herein, the phrase "a number" means one or more. As used herein, the phrase "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. For example, the illustrative embodiments have been described with respect to mixed integrity modes, and illustrative embodiment can be applied to processors running lockstep, or other types of environments in which at least one of processing synchronization or message exchange are designed. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for synchronizing messages between processors, the method comprising:
    receiving, by a first external device, inbound messages for applications running redundantly in high integrity mode on two or more multi-core processors, wherein each inbound message has a separate message queue on each of the multi-core processors, wherein each message queue contains a number of timestamped copies of an inbound message, and wherein an application running on the multi-core processors only reads the most recent timestamped copy of an inbound message to arrive in a message queue before the application begins running;
    synchronously copying the inbound messages to the multi-core processors;
    sending, by the multi-core processors, outbound messages to respective alignment queues in the first external device or a second external device, wherein the outbound messages contain calculation results from the inbound messages;
    comparing, by the first or second external device, the alignment queues;
    sending, by the first or second external device, matched outbound messages in the alignment queues to a network or data bus; and
    discarding, by the first or second external device, any unmatched outbound messages in the alignment queues.

2. The method of claim 1, wherein the inbound messages are placed in queues in the first external device, and wherein the first external device pushes the inbound messages from the queues to memory buffers in the multi-core processors.

3. The method of claim 1, wherein the first external device comprises a respective queue for each application running on the multi-core processors.

4. The method of claim 1, wherein the first external device comprises a queue for each core in the multi-core processors, wherein each core comprises a first memory buffer and a second memory buffer, and wherein the first external device:
    pushes copies of inbound messages to the first memory buffers of the cores when an application running on the cores is reading from the second memory buffers; or
    pushes copies of inbound messages to the second memory buffers of the cores when an application running on the cores is reading from the first memory buffers;
    wherein the cores switch between the first memory buffer and the second memory buffer only when a new application begins running on the cores and a new inbound message was pushed by the first external device while a previous application was running on the cores.

5. The method of claim 1, wherein a number of inbound data distribution agents run concurrently on the multi-core processors, wherein a subset of the applications running on the multi-core processors are associated with each inbound data distribution agent, wherein each inbound data distribution agent reads a specified number of inbound messages from the first external device and distributes the read inbound messages to the subset of applications associated with that inbound data distribution agent, wherein the specified number of inbound messages read from the first external device by an inbound data distribution agent is the same for all the multi-core processors, and wherein the subset of applications associated with an inbound data distribution agent do not run during a time window in which the inbound data distribution agent reads the specified number of inbound messages from the first external device.

6. The method of claim 1, wherein each of the applications running on the multi-core processors includes an inbound data distribution agent that reads a specified number of inbound messages from the first external device when an application begins running, and wherein the specified number of inbound messages read from the first external device by an inbound data distribution agent is the same for all the multi-core processors.

7. The method of claim 1, wherein a number of outbound data distribution agents run concurrently on the multi-core processors, wherein each outbound data distribution agent receives outbound messages from a subset of the applications running on the multi-core processors and distributes the received outbound messages to the respective alignment queues in the first or second external device, wherein the subset of applications from which each outbound data distribution agent receives outbound messages run in a time window before the outbound data distribution agent begins running.

8. The method of claim 7, wherein an outbound data distribution agent only receives outbound messages not previously received by another outbound data distribution agent during a prior time window.

9. The method of claim 1, wherein each core in the multi-core processors sends outbound messages to an alignment queue designated for that core in the first or second external device, and wherein any unmatched outbound messages from a core are discarded when a new application begins running on that core.

10. A method for synchronizing messages between processors, the method comprising:
    receiving, by a first external device, inbound messages for applications running redundantly in high integrity mode on two or more multi-core processors, wherein the first external device comprises an even queue and an odd queue for each core in the multi-core processors, wherein each core comprises an even memory buffer and an odd memory buffer, and wherein the first external device:
        pushes a copy of an inbound message from the even queue to the even memory buffers of the cores when an application running on the cores is reading from the odd memory buffers; or
        pushes a copy of an inbound message from the odd queue to the odd memory buffers of the cores when an application running on the cores is reading from the even memory buffers;
    synchronously copying the inbound messages to the multi-core processors;
    sending, by the multi-core processors, outbound messages to respective alignment queues in the first external device or a second external device, wherein the outbound messages contain calculation results from the inbound messages;

comparing, by the first or second external device, the alignment queues;

sending, by the first or second external device, matched outbound messages in the alignment queues to a network or data bus; and discarding, by the first or second external device, any unmatched outbound messages in the alignment queues.

11. A method for synchronizing messages between processors, the method comprising:

receiving a number of inbound messages at a first external device, wherein the inbound messages are designated for a number of applications running redundantly in high integrity mode on a first processor and a second processor, wherein the first and second processors each comprise a number of cores, wherein each inbound message has a separate message queue on each of the first and second processors, wherein each message queue contains a number of timestamped copies of an inbound message, and wherein an application running on the first and second processors only reads the most recent timestamped copy of an inbound message to arrive in a message queue before the application begins running;

synchronously copying the inbound messages to respective memory buffers in the first and second processors;

reading, by the applications, the inbound messages from the respective memory buffers;

performing, by the applications, calculations according to the inbound messages;

outputting, by the applications, calculation results;

sending, by the first and second processors, respective outbound messages containing the calculation results to respective alignment queues in the first external device or a second external device;

comparing, by the first or second external device, the alignment queues;

determining, by the first or second external device, if the alignment queues contain matching outbound messages;

if the alignment queues contain matched outbound messages, sending, by the first or second external device, the matched outbound messages to a network or data bus; and if one of the alignment queues contains an unmatched outbound message, discarding, by the first or second external device, the unmatched outbound message.

12. The method of claim 11, wherein the inbound messages are placed in a number of queues in the first external device, and wherein the first external device pushes the inbound messages from the queues to the memory buffers in the first and second processors.

13. The method of claim 11, wherein the first external device comprises a respective queue for each application running on the first and second processors.

14. The method of claim 11, wherein the first external device comprises a queue for each core in the first and second processors, wherein each core comprises a first memory buffer and a second memory buffer, and wherein the first external device:

pushes copies of inbound messages to the first memory buffers of the cores when an application running on the cores is reading from the second memory buffers; or pushes copies of inbound messages to the second memory buffers of the cores when an application running on the cores is reading from the first memory buffers;

wherein the cores switch between the first memory buffer and the second memory buffer only when a new application begins running on the cores and a new inbound message was pushed by the first external device while a previous application was running on the cores.

15. The method of claim 11, wherein a number of inbound data distribution agents run concurrently on the first and second processors, wherein a subset of the applications running on the first and second processors are associated with each inbound data distribution agent, wherein each inbound data distribution agent reads a specified number of inbound messages from the first external device and distributes the read inbound messages to the subset of applications associated with that inbound data distribution agent, wherein the specified number of inbound messages read from the first external device by an inbound data distribution agent is the same for both the first and second processors, and wherein the subset of applications associated with an inbound data distribution agent do not run during a time window in which the inbound data distribution agent reads the specified number of inbound messages from the first external device.

16. The method of claim 11, wherein each of the applications running on the first and second processors includes an inbound data distribution agent that reads a specified number of inbound messages from the first external device when an application begins running, and wherein the specified number of inbound messages read from the first external device by an inbound data distribution agent is the same for both the first and second processors.

17. The method of claim 11, wherein a number of outbound data distribution agents run concurrently on the first and second processors, wherein each outbound data distribution agent receives outbound messages from a subset of the applications running on the first and second processors and distributes the received outbound messages to the respective alignment queues in the first or second external device, and wherein the subset of applications from which each outbound data distribution agent receives outbound messages run in a time window before the outbound data distribution agent begins running.

18. The method of claim 17, wherein an outbound data distribution agent only receives outbound messages not previously received by another outbound data distribution agent during a prior time window.

19. The method of claim 11, wherein each core in the first and second processors sends outbound messages to an alignment queue designated for that core in the first or second external device, and wherein any unmatched outbound messages from a core are discarded when a new application begins running on that core.

20. A method for synchronizing messages between processors, the method comprising:

receiving a number of inbound messages at a first external device, wherein the inbound messages are designated for a number of applications running redundantly in high integrity mode on a first processor and a second processor, wherein the first and second processors each comprise a number of cores, wherein the first external device comprises an even queue and an odd queue for each core in the first and second processors, wherein each core comprises an even memory buffer and an odd memory buffer, and wherein the first external device:

pushes a copy of an inbound message from the even queue to the even memory buffers of the cores when an application running on the cores is reading from the odd memory buffers; or pushes a copy of an inbound message from the odd queue to the odd memory buffers of the cores when an application running on the cores is reading from the even memory buffers;

synchronously copying the inbound messages to respective memory buffers in the first and second processors;

reading, by the applications, the inbound messages from the respective memory buffers;

performing, by the applications, calculations according to the inbound messages;

outputting, by the applications, calculation results;

sending, by the first and second processors, respective outbound messages containing the calculation results to respective alignment queues in the first external device or a second external device;

comparing, by the first or second external device, the alignment queues;

determining, by the first or second external device, if the alignment queues contain matching outbound messages;

if the alignment queues contain matched outbound messages, sending, by the first or second external device, the matched outbound messages to a network or data bus; and if one of the alignment queues contains an unmatched outbound message, discarding, by the first or second external device, the unmatched outbound message.

21. A system for synchronizing messages between processors, the system comprising:

two or more multi-core processors; and an external device configured to:

receive inbound messages for applications running redundantly in high integrity mode on the multi-core processors, wherein the inbound messages are synchronously copied to the multi-core processors, wherein each inbound message has a separate message queue on each of the first and second processors, wherein each message queue contains a number of timestamped copies of an inbound message, and wherein an application running on the first and second processors only reads the most recent timestamped copy of an inbound message to arrive in a message queue before the application begins running;

receive, in respective alignment queues, outbound messages sent by the multi-core processors, wherein the outbound messages contain calculation results from the inbound messages;

compare the alignment queues;

send matched outbound messages in the alignment queues to a network or data bus; and discard any unmatched outbound messages in the alignment queues.

22. The system of claim 21, wherein the external device comprises a respective queue for each application running on the multi-core processors.

23. The system of claim 21, wherein the external device comprises a queue for each core in the multi-core processors, wherein each core comprises a first memory buffer and a second memory buffer, and wherein the external device:

pushes copies of inbound messages to the first memory buffers of the cores when an application running on the cores is reading from the second memory buffers; or pushes copies of inbound messages to the second memory buffers of the cores when an application running on the cores is reading from the first memory buffers;

wherein the cores switch between the first memory buffer and the second memory buffer only when a new application begins running on the cores and a new inbound message was pushed by the external device while a previous application was running on the cores.

24. The system of claim 21, wherein a number of inbound data distribution agents run concurrently on the multi-core processors, wherein a subset of the applications running on the multi-core processors are associated with each inbound data distribution agent, wherein each inbound data distribution agent reads a specified number of inbound messages from the external device and distributes the read inbound messages to the subset of applications associated with that inbound data distribution agent, wherein the specified number of inbound messages read from the external device by an inbound data distribution agent is the same for all the multi-core processors, and wherein the subset of applications associated with an inbound data distribution agent do not run during a time window in which the inbound data distribution agent reads the specified number of inbound messages from the external device.

25. The system of claim 21, wherein each of the applications running on the multi-core processors includes an inbound data distribution agent that reads a specified number of inbound messages from the external device when an application begins running, and wherein the specified number of inbound messages read from the external device by an inbound data distribution agent is the same for all the multi-core processors.

26. The system of claim 21, wherein a number of outbound data distribution agents run concurrently on the multi-core processors, wherein each outbound data distribution agent receives outbound messages from a subset of the applications running on the multi-core processors and distributes the received outbound messages to the respective alignment queues in the external device, wherein the subset of applications from which each outbound data distribution agent receives outbound messages run in a time window before the outbound data distribution agent begins running, and wherein an outbound data distribution agent only receives outbound messages not previously received by another outbound data distribution agent during a prior time window.

27. The system of claim 21, wherein each core in the multi-core processors sends outbound messages to an alignment queue designated for that core in the external device, and wherein any unmatched outbound messages from a core are discarded when a new application begins running on that core.

28. A system for synchronizing messages between processors, the system comprising:

two or more multi-core processors; and an external device configured to:

receive inbound messages for applications running redundantly in high integrity mode on the multi-core processors, wherein the inbound messages are synchronously copied to the multi-core processors, wherein the external device comprises an even queue and an odd queue for each core in the multi-core processors, wherein each core comprises an even memory buffer and an odd memory buffer, and wherein the external device:

pushes a copy of an inbound message from the even queue to the even memory buffers of the cores when an application running on the cores is reading from the odd memory buffers; or
pushes a copy of an inbound message from the odd queue to the odd memory buffers of the cores when an application running on the cores is reading from the even memory buffers;
receive, in respective alignment queues, outbound messages sent by the multi-core processors, wherein the outbound messages contain calculation results from the inbound messages;
compare the alignment queues;
send matched outbound messages in the alignment queues to a network or data bus; and
discard any unmatched outbound messages in the alignment queues.

29. A system for synchronizing messages between processors, the system comprising:
two or more multi-core processors;
a first external device configured to receive inbound messages for applications running redundantly in high integrity mode on the multi-core processors, wherein the inbound messages are synchronously copied to the multi-core processors, wherein each inbound message has a separate message queue on each of the first and second processors, wherein each message queue contains a number of timestamped copies of an inbound message, and wherein an application running on the first and second processors only reads the most recent timestamped copy of an inbound message to arrive in a message queue before the application begins running; and
a second external device configured to:
receive, in respective alignment queues, outbound messages sent by the multi-core processors, wherein the outbound messages contain calculation results from the inbound messages;
compare the alignment queues;
send matched outbound messages in the alignment queues to a network or data bus; and
discard any unmatched outbound messages in the alignment queues.

30. The system of claim 29, wherein the first external device comprises a respective queue for each application running on the multi-core processors.

31. The system of claim 29, wherein the first external device comprises a queue for each core in the multi-core processors, wherein each core comprises a first memory buffer and a second memory buffer, and wherein the first external device:
pushes copies of inbound messages to the first memory buffers of the cores when an application running on the cores is reading from the second memory buffers; or
pushes copies of inbound messages to the second memory buffers of the cores when an application running on the cores is reading from the first memory buffers;
wherein the cores switch between the first memory buffer and the second memory buffer only when a new application begins running on the cores and a new inbound message was pushed by the first external device while a previous application was running on the cores.

32. The system of claim 29, wherein a number of inbound data distribution agents run concurrently on the multi-core processors, wherein a subset of the applications running on the multi-core processors are associated with each inbound data distribution agent, wherein each inbound data distribution agent reads a specified number of inbound messages from the first external device and distributes the read inbound messages to the subset of applications associated with that inbound data distribution agent, wherein the specified number of inbound messages read from the first external device by an inbound data distribution agent is the same for all the multi-core processors, and wherein the subset of applications associated with an inbound data distribution agent do not run during a time window in which the inbound data distribution agent reads the specified number of inbound messages from the first external device.

33. The system of claim 29, wherein each of the applications running on the multi-core processors includes an inbound data distribution agent that reads a specified number of inbound messages from the first external device when an application begins running, and wherein the specified number of inbound messages read from the first external device by an inbound data distribution agent is the same for all the multi-core processors.

34. The system of claim 29, wherein a number of outbound data distribution agents run concurrently on the multi-core processors, wherein each outbound data distribution agent receives outbound messages from a subset of the applications running on the multi-core processors and distributes the received outbound messages to the respective alignment queues in the second external device, wherein the subset of applications from which each outbound data distribution agent receives outbound messages run in a time window before the outbound data distribution agent begins running, and wherein an outbound data distribution agent only receives outbound messages not previously received by another outbound data distribution agent during a prior time window.

35. The system of claim 29, wherein each core in the multi-core processors sends outbound messages to an alignment queue designated for that core in the second external device, and wherein any unmatched outbound messages from a core are discarded when a new application begins running on that core.

36. A system for synchronizing messages between processors, the system comprising:
two or more multi-core processors;
a first external device configured to receive inbound messages for applications running redundantly in high integrity mode on the multi-core processors, wherein the inbound messages are synchronously copied to the multi-core processors, wherein the first external device comprises an even queue and an odd queue for each core in the multi-core processors, wherein each core comprises an even memory buffer and an odd memory buffer, and wherein the first external device:
pushes a copy of an inbound message from the even queue to the even memory buffers of the cores when an application running on the cores is reading from the odd memory buffers; or
pushes a copy of an inbound message from the odd queue to the odd memory buffers of the cores when an application running on the cores is reading from the even memory buffers; and
a second external device configured to:
receive, in respective alignment queues, outbound messages sent by the multi-core processors, wherein the outbound messages contain calculation results from the inbound messages;
compare the alignment queues;
send matched outbound messages in the alignment queues to a network or data bus; and discard any unmatched outbound messages in the alignment queues.

* * * * *